US012688518B2

(12) United States Patent
Rajamani et al.

(10) Patent No.: US 12,688,518 B2
(45) Date of Patent: *Jul. 21, 2026

(54) DYNAMICALLY ADJUSTING DIGITAL COMPONENT CAMPAIGN VALUES FOR DISENGAGED CONSUMERS

(71) Applicant: Google LLC, Mountain View, CA (US)

(72) Inventors: Srinivas Rajamani, San Jose, CA (US); Matthew Dempsey, San Jose, CA (US); Manish Kurse, Los Altos, CA (US); Geoffrey Levine, San Jose, CA (US); Zhi Xing, San Jose, CA (US); Tal Akabas, Palo Alto, CA (US); Dongguang You, Sunnyvale, CA (US); Yuan Fang, Palo Alto, CA (US); Zheng Shi, San Carlos, CA (US); Digvijay Singh, Mountain View, CA (US); Shrikrishna Shrin, San Jose, CA (US); Yifan Liu, Fremont, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/661,931

(22) Filed: May 13, 2024

(65) Prior Publication Data

US 2024/0386467 A1 Nov. 21, 2024

Related U.S. Application Data

(63) Continuation-in-part of application No. 18/545,821, filed on Dec. 19, 2023.

(Continued)

(51) Int. Cl.
G06Q 30/0201 (2023.01)
G06Q 30/0273 (2023.01)
G06Q 30/0242 (2023.01)

(52) U.S. Cl.
CPC ..... G06Q 30/0275 (2013.01); G06Q 30/0201 (2013.01); G06Q 30/0243 (2013.01)

(58) Field of Classification Search
CPC ............. G06Q 30/0201; G06Q 30/0207–0277
(Continued)

(56) References Cited

U.S. PATENT DOCUMENTS 11,138,631 B1 * 10/2021 Perevodchikov ...... G06N 20/20
2008/0004937 A1 * 1/2008 Chow ................... G06F 16/958
707/E17.116

(Continued)

FOREIGN PATENT DOCUMENTS

WO 2014149608 A1 9/2014

OTHER PUBLICATIONS

F. Optimove, "6 Ways to Re-engage Lapsed Users", retrieved from https://www.optimove.com/resources/blog/6-ways-to-re-engage-lapsed-users, available on Dec. 29, 2022 (Year: 2022).*
(Continued)

*Primary Examiner* — Sam Refai
(74) *Attorney, Agent, or Firm* — Lerner David LLP

(57) ABSTRACT

The technology is generally directed to determining whether a consumer being presented with a digital component is a disengaged and/or qualifying disengaged consumer at the time the digital component is being selected. An artificial intelligence model may be trained and used to predict whether the consumer is a disengaged and/or qualifying disengaged consumer. The prediction may be a probability representing the likelihood that the user is a disengaged and/or qualifying disengaged consumer for a given merchant. The probability may be used to dynamically adjust the merchant's bid at the time of auction to have the merchant's digital component selected. The probability may, in some examples, may be used to dynamically adjust the conversion (Continued)

values after the merchant's digital component is provided for output.

21 Claims, 15 Drawing Sheets

Related U.S. Application Data

(60) Provisional application No. 63/468,024, filed on May 22, 2023, provisional application No. 63/467,739, filed on May 19, 2023.

(58) Field of Classification Search
USPC ............................................. 705/14.1–14.73
See application file for complete search history.

(56) References Cited

U.S. PATENT DOCUMENTS

| | | | | |
|---|---|---|---|---|
| 2019/0139079 | A1 | 5/2019 | Nataf | |
| 2019/0318390 | A1 | 10/2019 | Wai | |
| 2020/0167834 | A1* | 5/2020 | Matsuoka | G06N 3/092 |
| 2021/0035163 | A1* | 2/2021 | Peris | G06Q 30/0243 |
| 2022/0171760 | A1* | 6/2022 | Qiu | H04N 21/4826 |
| 2023/0096957 | A1* | 3/2023 | Noro | G06N 20/00 |
| | | | | 706/12 |

OTHER PUBLICATIONS

International Search Report and Written Opinion for International Application No. PCT/US2024/029392 dated Jul. 11, 2024. 23 pages.

About conversion value rules—Google Ads Help; [online] [retrieved Apr. 26, 2023]. Retrieved from the Internet: <https://support.google.com/google-ads/answer/10518330?hl=en>, 2 pages.

Vallaeys, F., "Value-Based Bidding In Google Ads_ How It Works, Best Practices & Pitfalls", Mar. 20, 2023, [online] Retrieved from the Internet: <https://www.optmyzr.com/blog/value-based-bidding-guide/>, 14 pages.

"4 steps to customer acquisition using data analytics", (Lexer blog), Aug. 16, 2019, [online] Retrieved from the Internet: <https://www.lexer.io/blog/4-steps-to-acquiring-high-value-customers>, 11 pages.

Swendeman, D., "Defining, Targeting, and Retaining High-Value Customers", Mar. 31, 2023, [online] retrieved trieved from the Internet: <https://www.daasity.com/post/high-value-customers>, 8 pages.

About conversion values—Google Ads Help [and Smart Bidding] , [online] Retrieved from the Internet: <https://www.lexer.io/blog/4-steps-to-acquiring-high-value-customers>, Dec. 2023, 2 pages.

International Search Report and Written Opinion for PCT Application No. PCT/US2023/085149, dated Feb. 26, 2024. 16 pages.

* cited by examiner

Reporting

| Campaign | Conversions | Conv. value | Disengaged consumer lifetime value | Disengaged consumers |
|---|---|---|---|---|
| ☐ ○ | | | | |
| ☐ ○ ☑ | 20 | 3000 | 2000 | 15 |
| Unknown | 2 | 100 | - | - |
| Disengaged consumers - High Value | 5 | 1250 | 1000 | 5 |
| Disengaged consumers - Other | 10 | 1500 | 1000 | 10 |
| Returning consumers | 3 | 150 | | |

Output Data
714

NCA System 702

First Stage Model
710

Second Stage
Model
712

Inference
Data
704

Training
Data
706

Ground
Truth Data
708

Reporting

| Campaign | Conversions | Conv. value | New consumer lifetime value | New consumers |
|---|---|---|---|---|
| ○ | 20 | 3000 | 2000 | 15 |
| ○ | | | | |
| Unknown | 2 | 100 | - | - |
| New consumer - High Value | 5 | 1250 | 1000 | 5 |
| New consumers - Other | 10 | 1500 | 1000 | 10 |
| Returning consumers | 3 | 150 | | |

FIG. 11

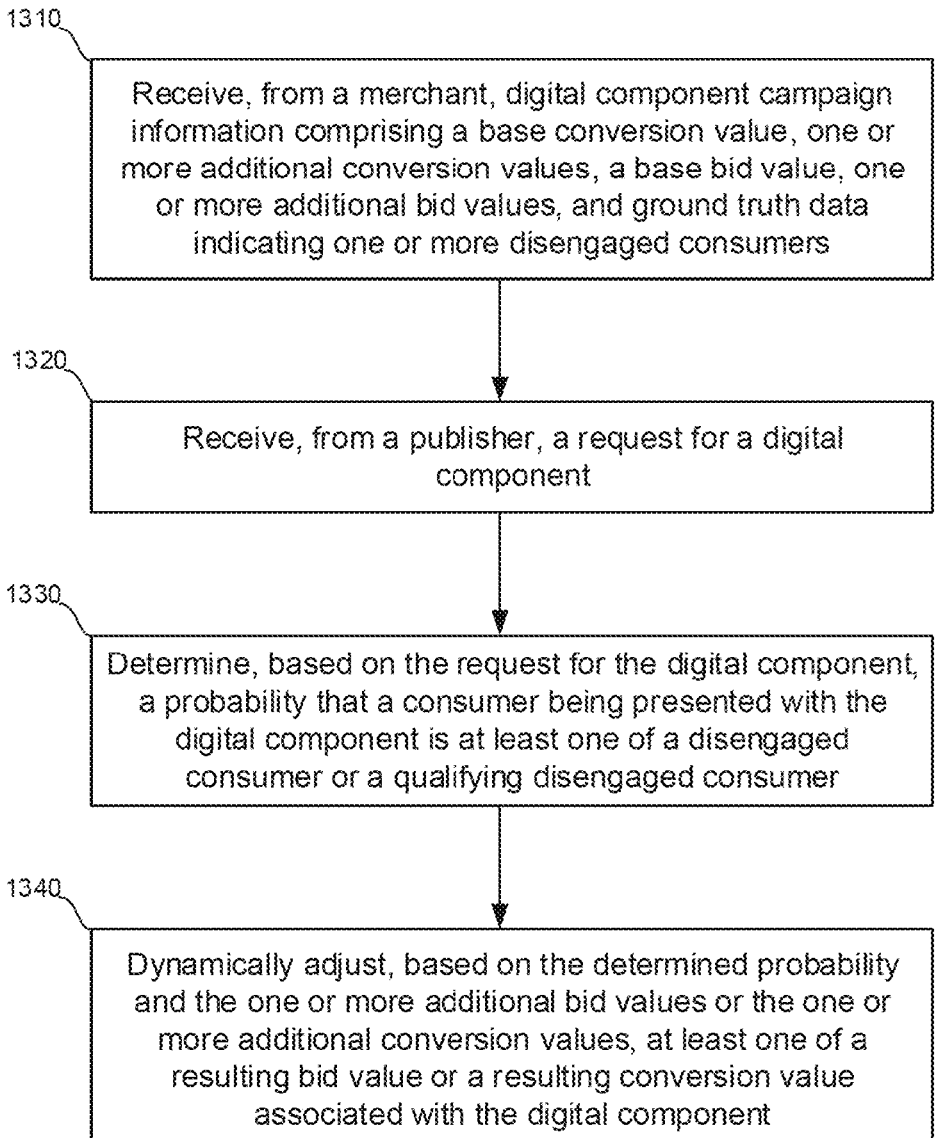

1310

Receive, from a merchant, digital component campaign information comprising a base conversion value, one or more additional conversion values, a base bid value, one or more additional bid values, and ground truth data indicating one or more disengaged consumers

1320

Receive, from a publisher, a request for a digital component

1330

Determine, based on the request for the digital component, a probability that a consumer being presented with the digital component is at least one of a disengaged consumer or a qualifying disengaged consumer

1340

Dynamically adjust, based on the determined probability and the one or more additional bid values or the one or more additional conversion values, at least one of a resulting bid value or a resulting conversion value associated with the digital component

FIG. 13

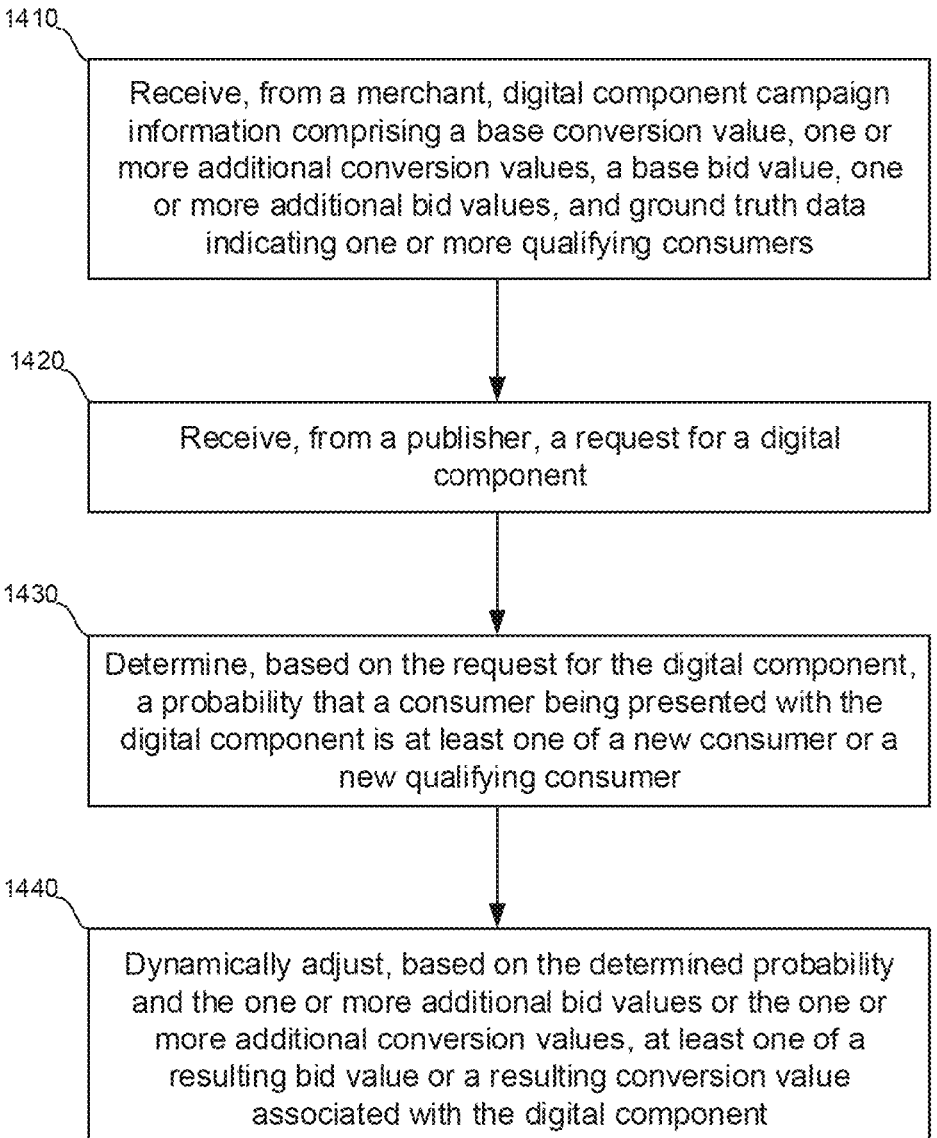

1410
Receive, from a merchant, digital component campaign information comprising a base conversion value, one or more additional conversion values, a base bid value, one or more additional bid values, and ground truth data indicating one or more qualifying consumers 1420
Receive, from a publisher, a request for a digital component 1430
Determine, based on the request for the digital component, a probability that a consumer being presented with the digital component is at least one of a new consumer or a new qualifying consumer 1440
Dynamically adjust, based on the determined probability and the one or more additional bid values or the one or more additional conversion values, at least one of a resulting bid value or a resulting conversion value associated with the digital component

FIG. 14

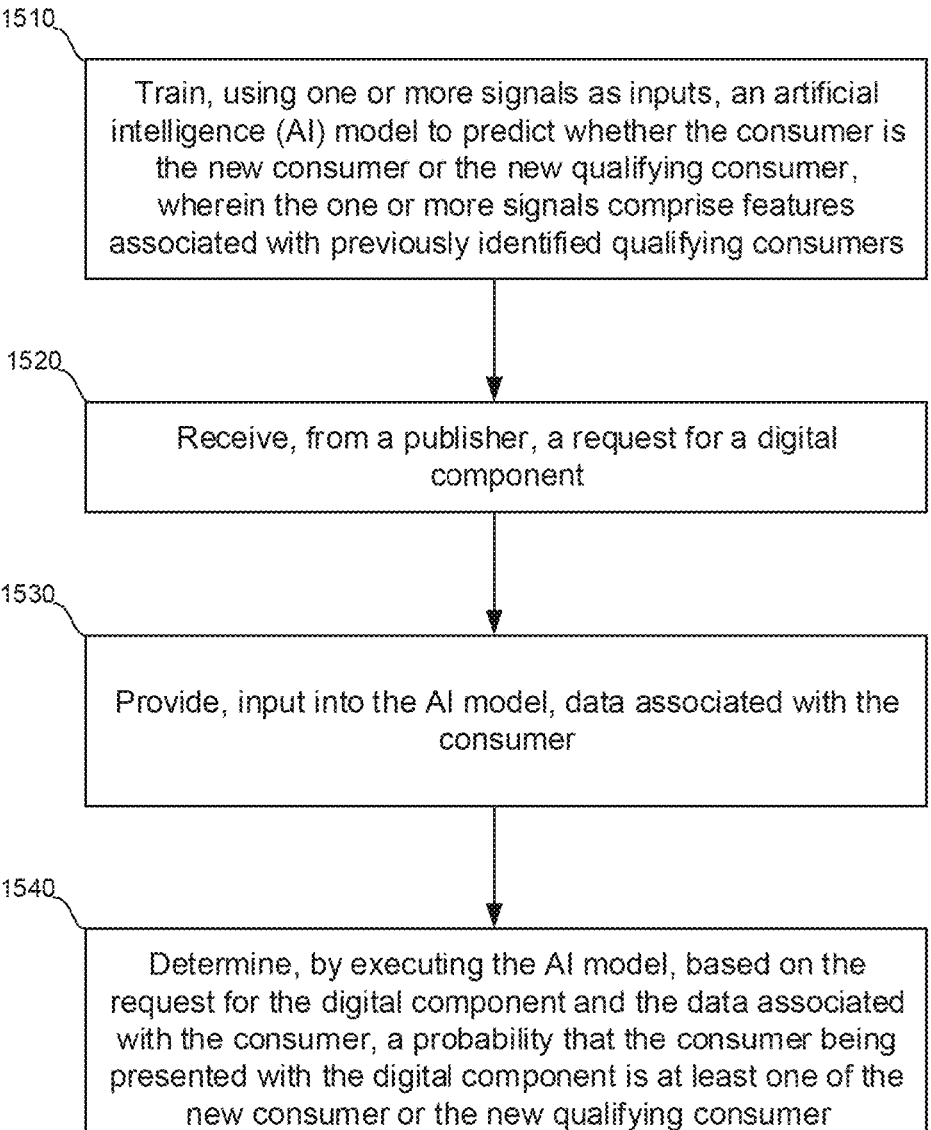

1510

Train, using one or more signals as inputs, an artificial intelligence (AI) model to predict whether the consumer is the new consumer or the new qualifying consumer, wherein the one or more signals comprise features associated with previously identified qualifying consumers

1520

Receive, from a publisher, a request for a digital component

1530

Provide, input into the AI model, data associated with the consumer

1540

Determine, by executing the AI model, based on the request for the digital component and the data associated with the consumer, a probability that the consumer being presented with the digital component is at least one of the new consumer or the new qualifying consumer

FIG. 15

DYNAMICALLY ADJUSTING DIGITAL COMPONENT CAMPAIGN VALUES FOR DISENGAGED CONSUMERS

CROSS REFERENCE TO RELATED APPLICATIONS

This application claims the benefit of the filing date of U.S. Provisional Patent Application No. 63/467,739, filed May 19, 2023 and is a continuation-in-part of U.S. patent application Ser. No. 18/545,821, filed on Dec. 19, 2023, which claims the benefit of the filing date of U.S. Provisional Patent Application No. 63/468,024 filed on May 22, 2023, the disclosures of which are hereby incorporated herein by reference.

BACKGROUND

Merchants typically generate a digital component campaign to obtain, retain or re-engage consumers. In an effort to have previously engaged consumers re-engage, merchants typically generate a digital component campaign that will increase bids and/or conversion values for a specific subset of consumers. This results in the merchant having to generate multiple digital component campaigns when the merchant wants to focus on specific subsets of consumers. This is time consuming for the merchant and computationally inefficient as the merchant may end up bidding against themselves at the time of auction.

BRIEF SUMMARY

One aspect of the technology is generally directed to determining whether a consumer being presented with a digital component is a disengaged and/or qualifying disengaged consumer at the time the digital component is being selected. An artificial intelligence (AI) model, such as a machine learning model, may be trained and used to predict whether the consumer is a disengaged consumer and/or a qualifying disengaged consumer. A disengaged consumer may be a consumer that has previously completed a conversion with a digital component associated with the merchant but meets one or more merchant specific disengagement criteria for a disengaged consumer. The criteria may be, for example, a threshold period of time since the last conversion, a threshold frequency of conversions, a threshold conversion value, or the like. A qualifying disengaged consumer may be, for example, a disengaged consumer that meets a predetermined set of qualifications. For example, the qualifying disengaged consumer may be a high value consumer that made a threshold number of purchases overall, a threshold number of purchases within a given time period, spent a threshold amount, etc. A high value consumer may be merchant specific and may be determined based on one or more merchant specific value qualifications. The merchant specific value qualifications for a high value consumer may include, for example, frequency of purchases, confirmation of signing up for a mailing list, total purchase price of orders, average order value, consumer lifetime value, category of goods and/or services purchased, demographics such as age, etc. A consumer that meets both the disengagement criteria for a disengaged consumer and the qualifications for a high value consumer may be a disengaged high value consumer.

The prediction may be a probability representing the likelihood that the user is a disengaged consumer and/or qualifying disengaged consumer for a given merchant. The probability may be used to dynamically adjust the merchant's bid at the time of auction to have the merchant's digital component selected. The probability may, in some examples, be used to dynamically adjust the conversion values after the merchant's digital component is provided for output.

Another aspect of the technology is generally directed to determining whether a consumer being presented with a digital component is a new and/or new qualifying consumer at the time the digital component is being selected. A machine learning model may be trained and used to predict whether the consumer is a new and/or new qualifying consumer. The prediction may be a probability representing the likelihood that the user is a new and/or new qualifying consumer for a given merchant. The probability may be used to dynamically adjust the merchant's bid at the time of auction to have the merchant's digital component selected. The probability may, in some examples, be used to dynamically adjust the conversion values after the merchant's digital component is provided for output.

One aspect of the disclosure is directed to a method, comprising: receiving, by one or more processors from a merchant, digital component campaign information comprising a base conversion value, one or more additional conversion values, a base bid value, one or more additional bid values, and ground truth data indicating one or more disengaged consumers, receiving, by the one or more processors from a publisher, a request for a digital component, determining, by the one or more processors based on the request for the digital component, a probability that a consumer being presented with the digital component is at least one of a disengaged consumer or a qualifying disengaged consumer, and dynamically adjusting, by the one or more processors based on the determined probability and the one or more additional bid values or the one or more additional conversion values, at least one of a resulting bid value or a resulting conversion value associated with the digital component.

The one or more disengaged consumers may be previously existing consumers that meet one or more disengagement criteria. The one or more disengagement criteria may comprise a set of criteria. The previously existing consumer may be a disengaged consumer when the previously existing consumer fulfills a threshold number of disengagement criteria of the set of criteria. The qualifying disengaged consumer may be a disengaged high value consumer. The disengaged consumer is a previously existing consumer that meets one or more disengagement criteria defined by the merchant, a high value consumer may be a consumer that meets one or more value qualifications defined by the merchant, and the disengaged high value consumer may be the consumer that meets the one or more value qualifications and the one or more disengagement criteria.

Determining the probability that the consumer being presented with the digital component is the at least one of a disengaged consumer or a qualifying disengaged consumer may occur at a time of bidding to select the digital component in response to the received request.

Determining the probability may comprise executing an AI model. The AI model may be trained using one or more signals as inputs, wherein the one or more signals comprise the ground truth data. The AI model may be trained to provide a prediction whether the consumer being presented the digital component is the at least one of the disengaged consumer or the qualifying disengaged consumer, and wherein the prediction is provided as at least one of a disengaged consumer probability or a qualifying disengaged consumer probability.

At least one of the one or more additional conversion values may correspond to a disengaged consumer conversion value or a qualifying disengaged consumer conversion value. Dynamically adjusting the resulting conversion value may comprise multiplying the disengaged consumer conversion value or the disengaged high value consumer conversion value with the respective disengaged consumer probability or qualifying disengaged consumer probability.

At least one of the one or more additional bid values may correspond to a disengaged consumer bid value or a qualifying disengaged consumer bid value. Determining the resulting bid value may comprise multiplying the disengaged consumer bid value or the qualifying disengaged consumer bid value with the respective disengaged consumer probability or qualifying disengaged consumer probability.

The method may further comprise determining, by the one or more processors based on the determined probability, whether a conversion is at least one of a disengaged consumer conversion or a qualifying disengaged consumer conversion. Determining whether the conversion is the at least one of the disengaged consumer conversion or the qualifying disengaged consumer conversion may comprise comparing, by the one or more processors, a randomized number to the determined probability comprising a qualifying disengaged consumer probability. When the randomized number is less than the qualifying disengaged consumer probability, the conversion may correspond to the qualifying disengaged consumer conversion. When the randomized number is greater than the qualifying disengaged consumer probability, the conversion may correspond to another type of conversion, wherein the other types of conversions include at least one of a disengaged consumer conversion, an existing consumer conversion, or an unknown consumer conversion.

Another aspect of the disclosure is directed to a system comprising one or more processors. The one or more processors may be configured to receive, from a merchant, digital component campaign information comprising a base conversion value, one or more additional conversion values, a base bid value, one or more additional bid values, and ground truth data indicating one or more disengaged consumers, receive, from a publisher, a request for a digital component, determine, based on the request for the digital component, a probability that a consumer being presented with the digital component is at least one of a disengaged consumer or a qualifying disengaged consumer, and dynamically adjust, based on the determined probability and the one or more additional bid values or the one or more additional conversion values, at least one of a resulting bid value or a resulting conversion value associated with the digital component.

Yet another aspect of the disclosure is directed to a non-transitory computer-readable medium storing instructions, which when executed by one or more processors, cause the one or more processors to receive, from a merchant, digital component campaign information comprising a base conversion value, one or more additional conversion values, a base bid value, one or more additional bid values, and ground truth data indicating one or more disengaged consumers, receive, from a publisher, a request for a digital component, determine, based on the request for the digital component, a probability that a consumer being presented with the digital component is at least one of a disengaged consumer or a qualifying disengaged consumer, and dynamically adjust, based on the determined probability and the one or more additional bid values or the one or more additional conversion values, at least one of a resulting bid value or a resulting conversion value associated with the digital component.

One aspect of the disclosure is directed to a method, comprising: receiving, by one or more processors from a merchant, digital component campaign information comprising a base conversion value, one or more additional conversion values, a base bid value, one or more additional bid values, and ground truth data indicating one or more qualifying consumers, receiving, by the one or more processors from a publisher, a request for a digital component, determining, by the one or more processors based on the request for the digital component, a probability that a consumer being presented with the digital component is at least one of a new consumer or a new qualifying consumer, and dynamically adjusting, by the one or more processors based on the determined probability and the one or more additional bid values or the one or more additional conversion values, at least one of a resulting bid value or a resulting conversion value associated with the digital component.

The one or more qualifying consumers may be determined based on a set of qualifications to determine whether an existing consumer is a qualifying consumer. When the existing consumer fulfills a threshold number of qualifications of the set of qualification, the existing consumer may be a qualifying consumer. The qualifying consumer may be a high value consumer.

Determining the probability that the consumer being presented with the digital component is the at least one of a new consumer or a new qualifying consumer may occur at a time of bidding to select the digital component in response to the received request.

Determining the probability may comprise executing a machine learning model. The machine learning model may be trained using one or more signals as inputs, wherein the one or more signals comprise the ground truth data. The machine learning model may be trained to provide a prediction whether the consumer being presented the digital component is at least one of the new consumer or the new qualifying consumer, and wherein the prediction is provided as at least one of a new consumer probability or a new qualifying consumer probability.

At least one of the one or more additional conversion values may correspond to a new consumer conversion value or a new qualifying consumer conversion value. Dynamically adjusting the resulting conversion value may comprise multiplying the new consumer conversion value or the new qualifying consumer conversion value with the respective new consumer probability or new qualifying consumer probability.

At least one of the one or more additional bid values may correspond to a new consumer bid value or a new qualifying consumer bid value. Determining the resulting bid value may comprise multiplying the new consumer bid value or the new qualifying consumer bid value with the respective new consumer probability or new qualifying consumer probability.

The method may further comprise determining, by the one or more processors based on the determined probability, whether a conversion is at least one of a new consumer conversion or a new qualifying consumer conversion. Determining whether the conversion is the at least one of the new consumer conversion or the new qualifying consumer conversion may comprise comparing, by the one or more processors, a randomized number to the determined probability comprising a new qualifying consumer probability. When the randomized number is less than the new qualifying consumer probability, the conversion may correspond to the new qualifying consumer conversion. When the randomized number is greater than the new qualifying consumer probability, the conversion may correspond to another type of conversion, wherein the other types of conversions include at least one of a new consumer conversion, an existing consumer conversion, or an unknown consumer conversion.

Another aspect of the disclosure is directed to a system comprising one or more processors. The one or more processors may be configured to receive, from a merchant, digital component campaign information comprising a base conversion value, one or more additional conversion values, a base bid value, one or more additional bid values, and ground truth data indicating one or more qualifying consumers, receive, from a publisher, a request for a digital component, determine, based on the request for the digital component, a probability that a consumer being presented with the digital component is at least one of a new consumer or a new qualifying consumer, and dynamically adjust, based on the determined probability and the one or more additional bid values or the one or more additional conversion values, at least one of a resulting bid value or a resulting conversion value associated with the digital component.

Yet another aspect of the disclosure is directed to a non-transitory computer-readable medium storing instructions, which when executed by one or more processors, cause the one or more processors to receive, from a merchant, digital component campaign information comprising a base conversion value, one or more additional conversion values, a base bid value, one or more additional bid values, and ground truth data indicating one or more qualifying consumers, receive, from a publisher, a request for a digital component, determine, based on the request for the digital component, a probability that a consumer being presented with the digital component is at least one of a new consumer or a new qualifying consumer, and dynamically adjust, based on the determined probability and the one or more additional bid values or the one or more additional conversion values, at least one of a resulting bid value or a resulting conversion value associated with the digital component.

BRIEF DESCRIPTION OF THE DRAWINGS

FIG. 6 is a screenshot illustrating an example user interface for reporting conversions from a digital component campaign according to aspects of the disclosure.

FIG. 11 is a screenshot illustrating an example user interface for reporting conversions from a digital component campaign according to aspects of the disclosure.

FIG. 13 is a flow diagram illustrating an example method of dynamically adjusting bid values and conversion values according to aspects of the disclosure.

FIG. 14 is a flow diagram illustrating an example method of dynamically adjusting bid values and conversion values according to aspects of the disclosure.

FIG. 15 is a flow diagram illustrating an example method of identifying new and/or new qualifying consumers.

DETAILED DESCRIPTION

Figure 1:
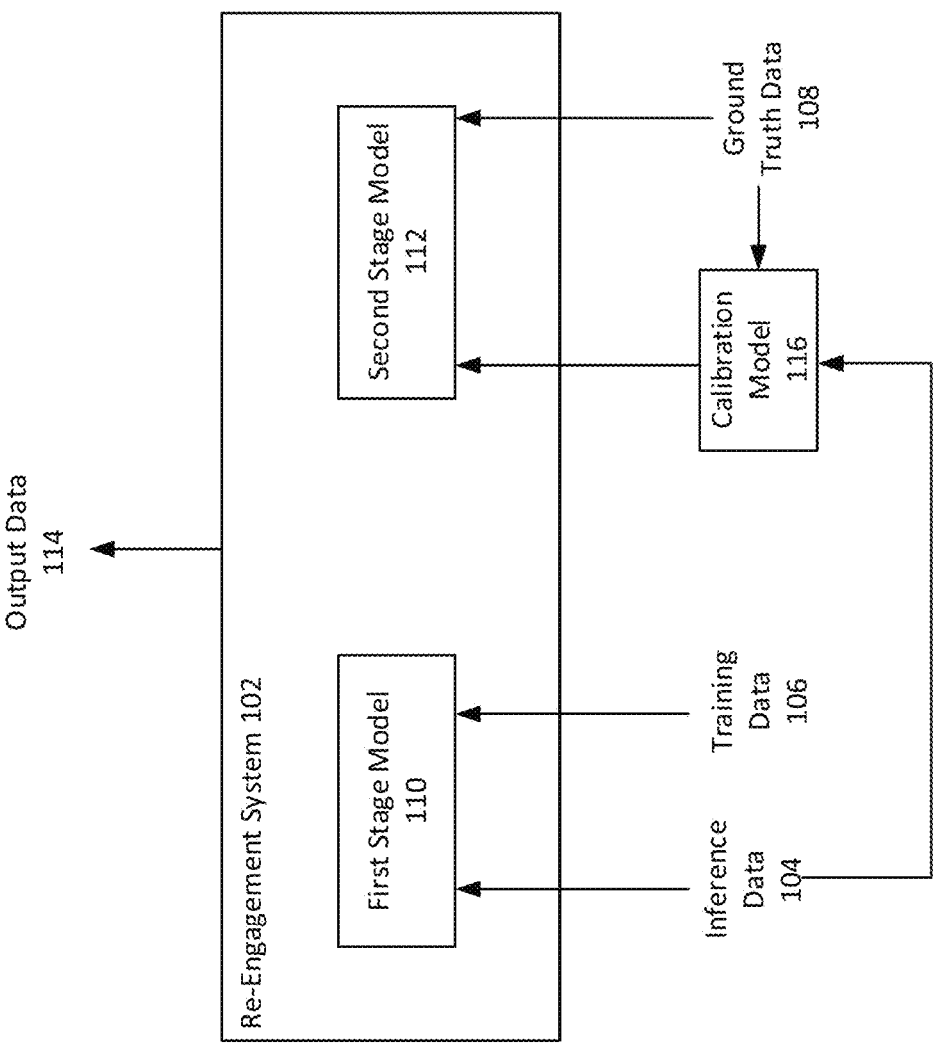
FIG. 1 is a block diagram of an example re-engagement system according to aspects of the disclosure.

One aspect of the technology is generally directed to determining whether a user being presented with a digital component is a disengaged and/or qualifying disengaged consumer at the time the digital component is being selected. A disengaged consumer may be merchant dependent. For example, a merchant may define one or more disengagement criteria to determine whether the consumer is a disengaged consumer. The disengagement criteria may be, for example, the existing consumer has not engaged with a digital component of the merchant within a threshold period of time, has not completed a conversion associated with the merchant within the threshold period of time, has not completed a conversion above a threshold value, or the like. A qualifying disengaged consumer may be merchant dependent. For example, a merchant may define one or more value qualifications to determine whether a consumer is a qualifying consumer. The value qualifications may be, for example, the frequency of purchases, confirmation of signing up for a mailing list, total purchase price of orders, average order value, consumer lifetime value, category of goods and/or services purchased, demographics such as age, or the like. Consumers that fulfill a threshold number of value qualifications may be determined to be qualifying consumers. According to some examples, a qualifying consumer may be a high value consumer. In such an example, a qualifying disengaged consumer may be a high value disengaged consumer. In some examples, a qualifying disengaged consumer may be a consumer that meets the threshold number of disengagement criteria and value qualifications.

A publisher may request a digital component to be presented to a user viewing the publisher's website or mobile application. At the time of the request, a digital component server may determine whether the user is a disengaged consumer and/or a disengaged high value consumer. The determination of whether the user is a disengaged consumer and/or a disengaged high value consumer may be made based on the merchant bidding on the digital component space. For example, a merchant may have generated a digital component campaign that included a list of existing consumers. The list may, in some examples, include an indication of consumers the merchant has determined to be disengaged consumers. The digital component campaign may include an additional bid values and conversion values, where the additional bid value and conversion values are to be used when a digital component is being presented to and/or engaged with by a disengaged consumer and/or a disengaged high value consumer.

According to some examples, the digital component server may use the merchant's list of existing consumers and disengaged consumers to determine a probability of the user being presented with the digital component being a disengaged consumer and/or a disengaged high value consumer for the given merchant. For example, the digital component server may execute an AI model, such as machine learning (ML) model, to predict the probability of the user being a disengaged consumer and/or a disengaged high value consumer for the merchant. The AI model may be trained, at least in part, based on digital component data obtained by the digital component server from a plurality of merchants. According to some examples, the digital component data may include user data. The digital component data and the user data may be used by the AI model after confirming the merchants and/or users have provided authorization.

According to some examples, after the AI model is trained based on digital component data, one or more parameters of the AI model may be changed, or updated, based on the digital component campaign of the merchant. For example, the parameters used by the merchant to identify disengaged consumers may be used to update parameters of the AI model. The AI model may use the merchant's existing consumer list and identified disengaged consumers as input. The AI model may compare the existing consumers on the merchant's list with the consumers indicated by the merchant as being disengaged consumers to determine disengagement criteria that result in a consumer being identified as a disengaged consumer. In some examples, the AI model may compare the existing consumers on the merchant's list with the consumers indicated by the merchant as being disengaged consumers to determine value qualifications that result in a consumer being identified as a qualifying consumer. The AI model may use the merchant's criteria and/or qualifications to predict whether the user being presented with the digital component would be considered a disengaged consumer and/or a qualifying disengaged consumer. The prediction may be determined as a probability or percentage.

In some examples, the parameters of the AI model may be changed, or updated, based on the output of a calibration model. The calibration model may receive the list of existing consumers and identified disengaged consumers from the merchant as input. The calibration model may be trained to determine the completeness of the merchant's input. For example, the calibration model may be trained to predict how many disengaged consumers the merchant did not identify as disengaged. According to some examples, the calibration model may be trained to predict the error rate at which the merchant fails to identify disengaged consumers. The predicted error rate output by the calibration model may be used to adjust the model predicting whether the user being present with the digital component would be considered a disengaged consumer and/or a qualifying disengaged consumer.

The prediction of the AI model may be used to dynamically adjust the bidding during an auction in response to the publisher's request for a digital component. For example, the digital component campaign may include a base bid value, an additional disengaged consumer bid value, and an additional qualifying disengaged consumer bid value. As an example, the base bid value may be $10, an additional disengaged consumer bid value may be $15, and an additional qualifying disengaged consumer bid value may be $20. The AI model may predict that there is a 60% chance that the user being presented the digital component is a disengaged consumer and an 80% chance that the user being presented the digital component is a qualifying disengaged consumer, conditioned on the user being a disengaged consumer. Based on the probability and the bid values provided by the merchant in the digital component campaign, the total bid value may be equal:

$$Bbase+Pde*[((1-Pqd)*Bdc)+(Pqd*Bqd)]$$

In the example equation, Bbase may be equal to the base bid value, Pde may correspond to the probability the user is a disengaged consumer, Bde may correspond to the additional disengaged consumer bid value, Pdq may correspond to the probability that the user is a qualifying disengaged consumer conditioned on the user being a disengaged consumer, and Bqd may correspond to the additional qualifying disengaged consumer bid value. Continuing with the example above, the total bid value may be equal to: $10+ 0.6*[((1-0.8)*$15)+ (0.8*$20)]=$21.4.

According to some examples, the bid values may additionally be determined based on whether a consumer is a new consumer. For example, a new consumer acquisition AI model may be trained to predict whether the user receiving the digital component is a disengaged consumer and/or a disengaged high value consumer for the given merchant. The AI model may be trained based on the audience list, e.g., the ground truth data, provided by the merchant. The ground truth data provided by the merchant characterizes consumers based on parameters, or attributes, regarding whether a given consumer is considered disengaged and/or disengaged high value consumers. The ground truth data is then used by the AI model to predict whether a respective consumer is going to be a disengaged and/or disengaged high value consumer based on the predefined ground truths provided by the merchant. The AI model may be trained to predict the likelihood the user receiving the digital component is a new consumer and/or a new high value consumer. Based on the probabilities of the user being a new consumer and/or a new high value consumer, the bid may be dynamically adjusted. For example, when generating the digital component campaign, the merchant may include additional bid values for a new consumer and a new high value consumer. In such an example, the ground truth data provided by the merchant may additionally, or in the alternative, characterize the consumer based on parameters regarding whether a given consumer is considered new and/or new high value.

The system may leverage lists of existing consumers, existing high value consumers, and/or disengaged consumers provided by the merchant. The system may use the provided lists to train the AI models to distinguish between these classes, e.g., existing, existing high value, disengaged, etc., based on patterns in the consumer's activity, such as searches, clicks, engagements, installs, or the like. The AI models, when executed, provide predictions for other consumers for which no ground truth was provided. Consumers for which no ground truth as provided are consumers that are not on any of the merchant provided lists.

According to some examples, the prediction of the AI model may be used to dynamically adjust the conversion value for the user's engagement with the digital component. For example, the digital component campaign may include a base conversion value, an additional disengaged consumer conversion value, and an additional qualifying disengaged consumer conversion value. As an example, the base conversion value may be $20, an additional disengaged consumer conversion value may be $25, and an additional qualifying disengaged consumer conversion value may be $30. The AI model may predict that there is a 75% chance that the user being presented the digital component is a disengaged consumer. Based on the probability and the conversion values provided by the merchant in the digital component campaign, the total conversion value may be equal to the base conversion value plus the probability times the disengaged consumer conversion value. In the example provided, this result in a total conversion value of $38.75=$20+ (0.75*$25).

When reporting conversions, the digital component server may use the probabilities determined by the AI model to determine whether the conversion is a qualifying, e.g., high value, conversion or not. For example, the probability of the user being a disengaged consumer and/or a qualifying disengaged consumer may be compared with a randomized number to determine whether to report the conversion as a disengaged high value conversion or not. The randomized number may be any number between the range used to predict the probabilities. For example, if the probabilities are based on a range of zero to 100, the randomized number will be a number between zero and 100.

Identifying disengaged and/or qualified disengaged consumers at the time of bidding allows for merchants to configure a digital component campaign to focus on obtaining disengaged and/or qualifying disengaged consumers. For example, existing consumers may be filtered out from receiving the digital components associated with the merchant's digital component campaign as the merchant. This may reduce computational bandwidth by transmitting digital components only to users who may have not already received and/or engaged with digital components associated with a given merchant.

Further, by identifying disengaged consumers and/or qualifying disengaged consumers at the time of bidding, merchants can dynamically adjust their bidding to be able to capture users who have not engaged with digital components associated with their campaigns within a threshold period of time, have not reported a conversion within a threshold period of time, have not converted a threshold value within a threshold period of time, or the like. This may increase the visibility of the merchant to the disengaged consumers while reducing computational bandwidth. For example, the number of digital components that are transmitted may be reduced as the merchant is focusing their digital component campaign on a specific audience rather than transmitting digital components to all users.

Further, computational bandwidth may be reduced as the merchant may create a single campaign that can dynamically adjust to meet their needs, rather than creating multiple digital component campaigns to reach the same goals. For example, in a single digital component campaign, the merchant may be able to dynamically adjust the total bid and/or conversion value for disengaged and/or qualifying disengaged consumers instead of having to create individual digital component campaigns for each type of user.

Additionally, as at least part of the AI model may be trained and/or calibrated offline, computational bandwidth may be saved as compared to having to train, calibrate, and use the AI model entirely online. This may reduce the use of network bandwidth and other resources, such as processor and memory overhead associated with training, calibrating, and using the model to predict whether the user receiving the digital component is a disengaged and/or qualifying disengaged consumer.

Further, previous digital component campaigns were static such that the merchant did not have the ability to adjust campaign values based on the knowledge of the consumer because the merchant's knowledge of the consumer is typically limited. The merchants, therefore, previously made campaigns based on the little to no knowledge they had regarding the consumers and were unable to make changes without having to create a new digital component campaign. Moreover, any new digital component campaigns created by the merchant were based on information obtained regarding the consumer after the fact, which does not allow for the merchant to take into consideration information regarding future consumers.

By using AI to identify disengaged and/or qualifying disengaged consumer, the system can provide a reliable probability value of what the consumer represents such that the digital component campaign values can be dynamically adjusted for each consumer at the time the consumer is provided the digital component. The trained AI model may bring forward the knowledge of the target, e.g., the consumer, as opposed to the existing systems in which merchants can only correct their digital component campaigns after conversions occur. Moreover, as cookies associated with web and application browsing are being eliminated, the trained AI model can predict the type of consumer, e.g., disengaged and/or qualifying disengaged, and anticipate what needs to be done with the campaign. Specifically, the trained AI model may predict the type of consumer and dynamically adjust the campaign values based on the prediction.

FIG. 1 depicts a block diagram of an example re-engagement system, which can be implemented on one or more computing devices. The re-engagement system 102 may be, for example, an AI model, such as a ML model. The re-engagement system 102 can be configured to receive inference data 104 and/or training data 106 for use in predicting whether a user receiving a digital component is a disengaged and/or disengaged high value consumer. For example, the re-engagement system 102 can receive the inference data and/or training data as part of a call to an application programming interface (API) exposing the re-engagement system 102 to one or more computing devices. Inference data 104 and/or training data 106 can also be provided to the re-engagement system 102 through a storage medium, such as remote storage connected to the one or more computing devices over a network. Inference data 104 and/or training data 106 can further be provided as input through a user interface on a client computing device coupled to the re-engagement system 102.

The inference data 104 can include data associated with predicting whether the user receiving the digital component is a disengaged consumer and/or a disengaged high value consumer. The inference data 104 may be one or more features used to train the re-engagement system 102. The features may be, for example, user data based on searches, engagements, installs, etc. According to some examples, the features may be whether the user had an impression with the digital component, whether the user clicked on the digital component, whether the user completed a purchase conversion, or the like. The user activity may be features used to train the one or more models in the re-engagement system 102 while conversions attributed to the user activity may be used as labels to train the one or more models in the re-engagement system 102.

The user data may be determined and used after the user provides authorization for the system to access and receive information related to the user's searches, clicks, engagements, installs, or the like. For example, the user may provide authorization to a website, application, or system to predict whether a user is a disengaged consumer or a disengaged high value consumer for a given merchant. The authorization may be for the application or system to access one or more databases or sub databases in the memory of the device. According to one example, the user may select specific sub-databases to which the application or system is granted access. For instance, the user may grant access to the search history database but not the browser history database.

According to some examples, the inference data may include data associated with digital components collected by the re-engagement system 102. The data associated with the digital components may include, for example, digital component campaign information, digital component conversion data, etc. associated with respective merchants of a plurality of merchants. According to some examples, the campaign information may include bid values, indications of qualifications consumers, or the like. The inference data 104 may be collected and/or used only after receiving authorization from the respective merchants for the re-engagement system to access and/or use the data associated with digital components.

The training data 106 can correspond to an artificial intelligence (AI) or machine learning task for predicting whether the user is a disengaged for a given merchant, such as a task performed by a neural network. In some examples, the training data can correspond to an AI or machine learning task for predicting one or more types of attributes associated with a disengaged consumer. The attributes may include, for example, low conversion frequency, low average conversion values, average time between conversions, or the like. According to some examples, the attributes may be based on a threshold period of time, such as a threshold period of time since the user's last conversion for a given merchant. The training data can be split into a training set, a validation set, and/or a testing set. An example training/validation/testing split can be an 80/10/10 split, although any other split may be possible. The training data 106 can include examples for predicting whether the user receiving the digital component is a disengaged and/or disengaged high value consumer for a given merchant.

According to some examples, the training data 106 may comprise labels associated with consumers that a given merchant has identified as disengaged consumer, qualifying disengaged consumer, or the like. The labeled consumers may be used to train the re-engagement system 102 to predict whether a consumer is a disengaged and/or qualifying disengaged consumer. According to some examples, the labeled consumers of a given merchant joined with the user data, e.g. the inference data, for training the re-engagement system 102. The training data 106 may, in some examples, be information that can be collected in the absence of cookies to train the model such that, when similar data is available, the AI model may be able to provide a probability that the consumer is a disengaged and/or qualifying disengaged consumer.

The training data 106 can be in any form suitable for training a model, according to one of a variety of different learning techniques. Learning techniques for training a model can include supervised learning, unsupervised learning, and semi-supervised learning techniques. For example, the training data can include multiple training examples that can be received as input by a model. The training examples can be labeled with a desired output for the model when processing the labeled training examples. The label and the model output can be evaluated through a loss function to determine an error, which can be backpropagated through the model to update weights for the model. For example, if the machine learning task is a classification task, the training examples can be images labeled with one or more classes categorizing subjects depicted in the images. As another example, a supervised learning technique can be applied to calculate an error between outputs, with a ground-truth label of a training example processed by the model. Any of a variety of loss or error functions appropriate for the type of the task the model is being trained for can be utilized, such as cross-entropy loss for classification tasks, or mean square error for regression tasks. The gradient of the error with respect to the different weights of the candidate model on candidate hardware can be calculated, for example using a backpropagation algorithm, and the weights for the model can be updated. The model can be trained until stopping criteria are met, such as a number of iterations for training, a maximum period of time, a convergence, or when a minimum accuracy threshold is met.

From the inference data 104 and/or training data 106, one or more parameters of the first stage of the re-engagement system 102 can be trained. The first stage 110 of the re-engagement system 102 may be trained to identify one or more characteristics of a user that is likely to complete a conversion for a given digital component. The one or more parameters of the first stage 110 of the re-engagement system 102 may be used as parameters for the second stage 112 of the re-engagement system 102. For example, the first stage 110 may be trained using generalized user data and/or digital component data for a plurality of merchants. The training and parameters of the first stage 110 may be further refined during the second stage 112 to be merchant specific. In some examples, the second stage 112 of the re-engagement system 102 may be used to predict the probability a user is a disengaged consumer and/or a disengaged high value consumer for a given merchant based on the parameters trained during the first stage 110.

In some examples, the first stage 110 of the re-engagement system 102 may map raw user data to a user representation, which is used by the second stage 112 of the re-engagement system 102. The second stage 112 of the re-engagement system 102 may adjust one or more of the one or more parameters of the first stage 110 of the re-engagement system 102. For example, after the one or more parameters of the first stage 110 of the re-engagement system 102 are trained, the parameters may be adjusted based on ground truth data 108 received from a merchant. The ground truth data 108 characterizes consumers based on what a merchant determines to be a disengaged and/or disengaged high value consumer. The characterization may be determined based on a last conversion, a last click through rate, a last purchase, or the like. The ground truth data 108 may include, for example, the merchant's audience list. The audience list may be a list of the merchant's existing consumers. In some examples, the audience list may include an indication of consumers the merchant considers to be disengaged consumers.

Associating labels of the ground truth data 108 with the features from the inference data 104 may allow the first stage 110 and the second stage 112 to be trained using the same features, e.g., the inference data 104, but have different labels. For example, the first stage 110 may be trained with labels corresponding to user conversion data while the second stage 112 may be trained based on merchant ground truth data 108.

According to some examples, the second stage 112 of the re-engagement system 102 may, be adjusted and/or trained for each respective merchant. The second stage 112 of the re-engagement system 102 may be trained to identify the differences between consumers the merchant has identified as disengaged consumers and existing, active, consumers.

The active consumers may be, for example, consumers that have made a conversion at a threshold frequency, made a conversion of a threshold value, or the like. The quality of the model may be improved in the second stage 112 by leveraging the user representations learned in the first stage 110 with the merchant specific data. The merchant specific data 108 may be the ground truth data 108.

The ground truth data 108 may be, in some examples, training data used to train the second stage of the re-engagement system. The ground truth data 108 can respond to an artificial intelligence (AI) or machine learning task for predicting whether the user receiving the digital component is a disengaged and/or disengaged high value consumer for the merchant providing the ground truth data, such as a task performed by a neural network. The ground truth data 108 can be split into a training set, a validation set, and/or a testing set. An example training/validation/testing split can be an 80/10/10 split, although any other split may be possible. The ground truth data 108 can include the merchant's audience list. The audience list may include a list of existing consumers. In some examples, the audience list may include an indication of the existing consumers the merchant identifies as high value consumers.

The ground truth data 108 can be in any form suitable for training a model, according to one of a variety of different learning techniques. Learning techniques for training a model can include supervised learning, unsupervised learning, and semi-supervised learning techniques. For example, the training data can include multiple training examples that can be received as input by a model. The training examples can be labeled with a desired output for the model when processing the labeled training examples. The label and the model output can be evaluated through a loss function to determine an error, which can be backpropagated through the model to update weights for the model. For example, if the machine learning task is a classification task, the training examples can be images labeled with one or more classes categorizing subjects depicted in the images. As another example, a supervised learning technique can be applied to calculate an error between outputs, with a ground-truth label of a training example processed by the model. Any of a variety of loss or error functions appropriate for the type of the task the model is being trained for can be utilized, such as cross-entropy loss for classification tasks, or mean square error for regression tasks. The gradient of the error with respect to the different weights of the candidate model on candidate hardware can be calculated, for example using a backpropagation algorithm, and the weights for the model can be updated. The model can be trained until stopping criteria are met, such as a number of iterations for training, a maximum period of time, a convergence, or when a minimum accuracy threshold is met.

From the one or more parameters trained in the first stage 110 of the re-engagement system 102 and updated in the second stage 112 of the re-engagement system 102. The parameters trained in the first stage 110 may, in some example, be further adjusted or updated in the second stage 112 based on the output of a calibration model 116. The calibration mode may receive the ground truth data 108 from the merchant.

According to some examples, the ground truth data 108 may be incomplete such that at least some of the merchant's disengaged consumers were not identified in the ground truth data 108 as disengaged consumers. The calibration model may predict how many of the merchant's existing consumers that were not identified by the merchant as disengaged consumers should be identified as disengaged consumers.

The calibration model 116 may be trained using inference data 104 and/or ground truth data 108. The inference data 104 and/or ground truth data 108 may include conversions reported by merchants as part of the digital component campaigns. The calibration model 116 may be trained using the conversions reported by the merchants as input, or inference, data. The conversions may be reported by merchants at the time of the conversion and may include an indication as to whether the consumer associated with the conversion was a disengaged consumer. The conversions may be compared to the ground truth data 108 provided by the merchant to determine whether the consumer associated with the conversion corresponds to a disengaged consumer in the merchant's ground truth data. According to some examples, the calibration model 116 may predict the incompleteness of a merchant's audience lists when the merchant does not provide additional parameters.

The re-engagement system 102 can be configured to output one or more results related to whether the user receiving the digital component is a disengaged consumer and/or disengaged high value consumer for a respective merchant generated as output data 114. The results related to whether the user receiving the digital component is a disengaged consumer and/or disengaged high value consumer for a respective merchant may be determined on a per merchant basis or on a per user basis. The results provided on a per merchant basis may be determined based on the information provided by the merchant to the re-engagement system 102. The information provided by the merchant may include, for example, a consumer list with an indication of consumers who qualify as disengaged, engaged, qualifying, e.g., high value, etc. In some examples, the information provided by the merchant may be criteria that can be used by the re-engagement system to determine, based on the merchant's consumer list, an indication of disengaged, engaged, quality, etc. consumers.

The results provided on a per consumer basis may be determined based on the individual user data in view of information provided by the merchant. For example, the consumer data may include previous transactions and/or actual conversions associated with digital components. In some examples, the consumer data may be associated with searches, clicks, engagements, installs, or the like. The consumer data may be compared to features and/or criteria of consumers identified as disengaged consumers for a given merchant. If the consumer data meets a threshold number of criteria for the merchant, the user may be identified as a disengaged consumer.

The consumer data may be determined and used after the consumer provides authorization for the system to access and receive information related to the consumer's searches, clicks, engagements, installs, or the like. For example, the consumer may provide authorization to a website, application, or system to predict whether a consumer is a new consumer or a new high value consumer for a given merchant. In some examples, the consumer may, additionally or alternatively, provide authorization to a website, application, or system to provide personalized digital components. The authorization to predict whether the consumer is a disengaged and/or disengaged qualifying, e.g., high value, consumer, receive personalized digital components, or the like may be for the application to system to access one or more databases or sub databases in the memory of the device. According to one example, the consumer may select specific sub-databases to which the application or system is granted access. For instance, the consumer may grant access to the search history database but not the browser history database.

As examples, the output data 114 can be any kind of score, classification, or regression output based on the input data. According to some examples, the output may be a probability or percentage. The probability may correspond to how likely the user is to be a disengaged and/or disengaged high value consumer. Correspondingly, the AI or machine learning task can be a scoring, classification, and/or regression task for predicting some output given some input. These AI or machine learning tasks can correspond to a variety of different applications in processing images, video, text, speech, or other types of data to predict whether the user receiving the digital component is a disengaged and/or disengaged high value consumer. The output data 114 can include instructions associated with whether the user receiving the digital component is a disengaged and/or disengaged high value consumer.

As an example, the re-engagement system 102 can be configured to send the output data 114 for display on a client or user display. As another example, the re-engagement system 102 can be configured to provide the output data as a set of computer-readable instructions, such as one or more computer programs. The computer programs can be written in any type of programming language, and according to any programming paradigm, e.g., declarative, procedural, assembly, object-oriented, data-oriented, functional, or imperative. The computer programs can be written to perform one or more different functions and to operate within a computing environment, e.g., on a physical device, virtual machine, or across multiple devices. The computer programs can also implement functionality described herein, for example, as performed by a system, engine, module, or model. The re-engagement system 102 can further be configured to forward the output data 114 to one or more other devices configured for translating the output data 114 into an executable program written in a computer programming language. The re-engagement system 102 can also be configured to send the output data 114 to a storage device for storage and later retrieval.

As shown in FIG. 1, and discussed above, the re-engagement system 102 can include one or more stage models 110, 112. The stage models can be implemented as one or more computer programs, specially configured electronic circuitry, or any combination thereof. The stage models can be configured to determine, generally, whether the user is a disengaged and/or disengaged high value consumer or, more specifically, whether the user is a disengaged and/or disengaged high value consumer for a given merchant.

According to some examples, the re-engagement system 102 may be calibrated, or evaluated. Calibrating the model may allow for at least a portion of the re-engagement system, such as the first stage and/or the second stage, to be offline while still being able to predict whether the user receiving the digital component is a disengaged and/or disengaged high value consumer. For example, the first stage model of the re-engagement system 102 may generate an embedded set of numbers to represent one or more users. The second stage of the model may generate one or more embedded set of numbers to represent respective merchants. Rather than the first and/or second stage models 110, 112 of the re-engagement system 102 being online, the embedded numbers representing the users and/or merchants may be provided online. This may reduce the network bandwidth and other resources such as processor and memory overhead associated with predicting whether the user receiving the digital component is a disengaged and/or disengaged high value consumer.

According to some examples, the re-engagement system 102 may be updated using a feedback loop. For example, as the re-engagement system 102 predicts the probability of whether a consumer is a disengaged and/or qualifying disengaged, the re-engagement system 102 may receive feedback related to the predictions. For example, if the re-engagement system 102 predicts that the consumer is a qualifying disengaged consumer, but the consumer ultimately does not meet the qualifications of a qualifying disengaged consumer for the given merchant, the re-engagement system 102 may receive the feedback that the prediction for that consumer and merchant pairing was inaccurate. The re-engagement system 102 may learn from the feedback, e.g., correct and/or incorrect predictions, such that the re-engagement system 102 may continuously update the AI model to provide more accurate predictions.

In some examples, the first stage 110 of the re-engagement system 102 may be retrained based on updated attributed conversions, which are translated into training data 106 and/or labels. The second stage 112 may be updated based on new ground truth data provided by the merchant and/or merchant provided normal-vs-high value labels and/or engaged-vs-disengaged for each conversion, compared against the prediction made earlier by the re-engagement system 102.

The predictions, or probabilities, output by the model may be used to dynamically adjust bidding at the time of auction for a digital component and/or conversion values. For example, the probability that the user receiving the digital component is a disengaged and/or disengaged high value consumer may be used to dynamically adjust the bidding by using the probability as a multiplier to be added to the base bid. In one example, the base bid may be $10 and the probability that the user is a disengaged and/or disengaged high value consumer may be 60%. At the time of auction to select a bid to present to the user in response to a publishers request, the bid may be dynamically adjusted to be the base bid, e.g., $10, plus an additional 60% of the base bid, e.g., $6, for a total bid of $16. Similarly, the probability that the user receiving the digital component is a disengaged and/or disengaged high value consumer may be used to dynamically adjust the conversion values by using the probability as a multiplier of the additional disengaged consumer conversion value and/or disengaged high value consumer conversion value. The resulting conversion value may be added to the base conversion value to determine a total conversion value. The conversion value may be adjusted with respect to the first purchase conversion value.

According to some examples, a bias correction factor may be used when determining the total bid and/or total conversion value. The bias correction factors may adjust the total to account for errors in the prediction that the user receiving the digital component is a disengaged and/or disengaged high value consumer. The bias correction factors may include, for example, changing the classification of a consumer from disengaged to active at the time of a purchase conversion, accounting for a plurality of conversions from a single engagement with a digital component, adjusting the bidding at the time of auction.

In one example, the bias correction factors may account for users that make multiple purchases from a single merchant such that only a single conversion is counted, rather than the multiple. For example, if data indicates that digital components from a given digital component campaign typically lead to three conversions from a single user, for each disengaged conversion there is a 33.33% chance that the disengaged conversion is a disengaged consumer while there is a 66.66% chance that the conversion represents an existing, active consumer.

Figure 2:
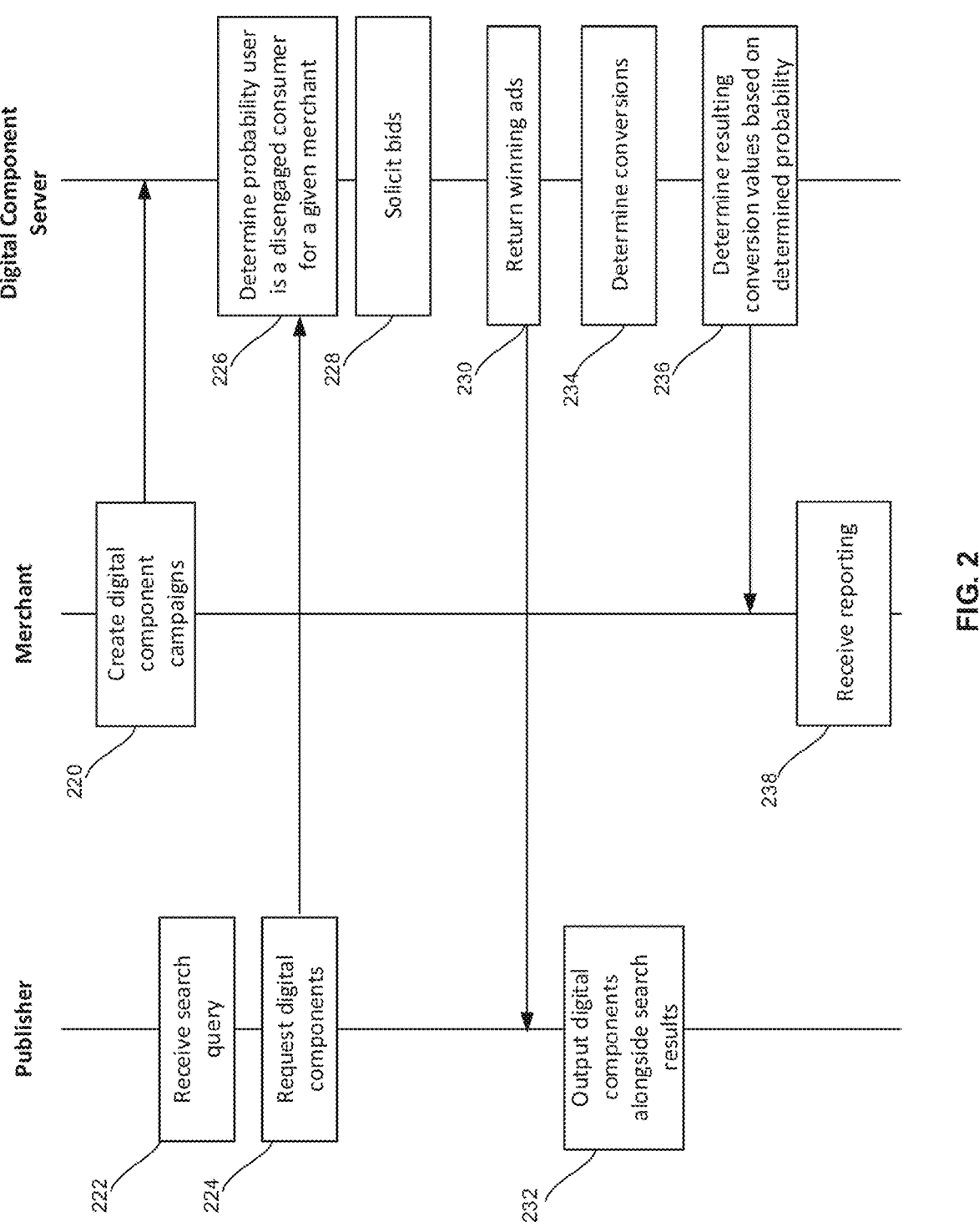
FIG. 2 is a sequence diagram according to aspects of the disclosure.

FIG. 2 is a sequence diagram of steps that may occur among a publisher, a merchant, and a digital component server. The publisher may provide content via a website or a mobile application. The merchant may be, for example, an advertiser. The digital component server may be, for example, an advertisement ("ad") server. The following operations do not have to be performed in the precise order described below. Rather, various operations can be handled in a different order or simultaneously, and operations may be added or omitted.

In block 220, the merchant may create a digital component campaign. A digital component campaign may include a digital component associated with the merchant, such as an ad, to be provided on a publisher's website or mobile application alongside the publisher's content. The digital component campaign may additionally include a bidding strategy, conversion values, target users, and the like.

Figure 3:
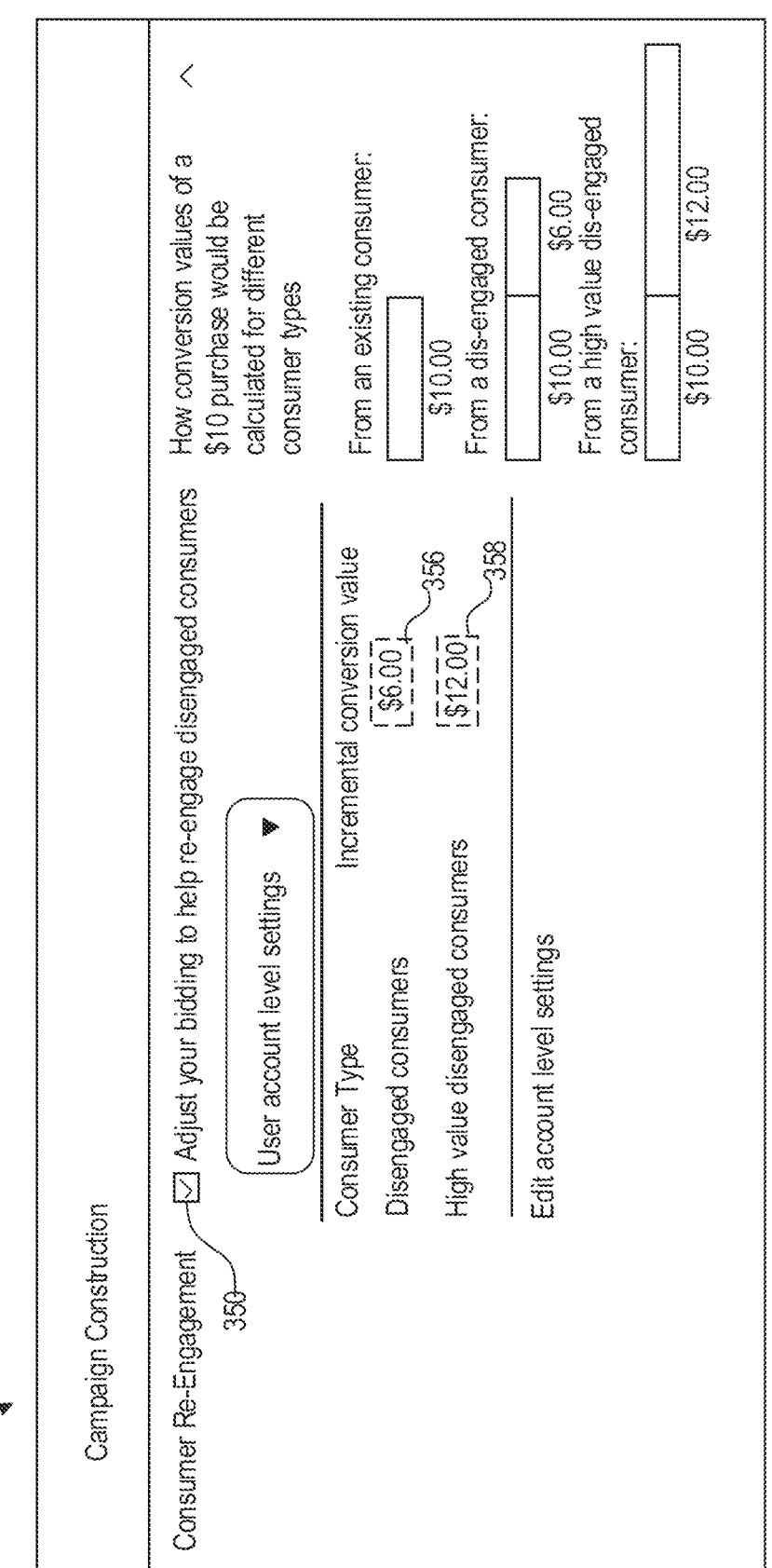
FIG. 3 is a screenshot illustrating an example user interface for creating a digital component campaign according to aspects of the disclosure.

FIG. 3 is a screenshot illustrating an example user interface 300 for creating a digital component campaign. The digital component campaign may be constructed to focus on consumer re-engagement. Focusing the digital component campaign on consumer re-engagement may include providing increased bids and conversion values for disengaged and/or disengaged high value consumers. The increased bids at the time of auction and the increased conversion values may be determined dynamically based on the prediction of whether the user receiving the digital component is a disengaged and/or disengaged high value consumer.

The user interface may include one or more input fields. The input fields may be configured to receive details relating to the digital component campaign. According to some examples, the inputs may correspond to a bidding strategy, bid values, conversion values, options to increase the bid and conversion values based on whether the user receiving the digital component is a disengaged and/or disengaged high value consumer.

As shown, input 350 may be to configure the digital component campaign to re-engaged consumers. Re-engaging consumers may, for example, include increasing bid values and/or conversion values for consumers the merchant has identified as disengaged. In some examples, re-engaging consumers may include increasing bid and/or conversion values for consumers the re-engagement system 102 has predicted is likely to be a disengaged and/or disengaged high value consumer for the merchant.

Input 350 may be for a bidding strategy to bid higher for disengaged consumers than for existing, active consumers. The higher bid may be determined dynamically, and automatically, at the time of auction based on the prediction of whether the user receiving the digital component is a disengaged and/or disengaged high value consumer. For example, the system may receive inputs indicating that the base bid is $20, the additional disengaged consumer bid is $25, and the additional disengaged high value consumer bid is $30. The re-engagement system, described with respect to FIG. 1, may predict that there is an 75% chance that the user receiving the digital component is a disengaged consumer and a 60% chance that the user is a disengaged high value consumer, conditioned on the user being a disengaged consumer. The total bid may be the base bid, e.g., $20, plus a portion of the additional disengaged consumer bid based on the disengaged consumer probability, e.g., 75% of $25, and a portion of the additional disengaged high value consumer bid. According to some examples, the portion of the additional disengaged high value consumer bid may be based on the probability, e.g., 60% of $30. In some examples, the portion of the additional disengaged high value consumer bid may be determined as Pde*Pqd*(Bqd+Bde), where Pqd is the probability that the user is a disengaged high value consumer and Bqd is the additional disengaged high value consumer bid value.

According to some examples, the bid values may additionally be determined based on whether a consumer is a new consumer. For example, a new consumer acquisition AI model may be trained to predict whether the user receiving the digital component is a new consumer and/or a new high value consumer for the given merchant. The AI model may be trained using a merchant's audience list, e.g., the ground truth data, as input. For example, the merchant may provide an indication of existing consumers that the merchant considers to be high value, or qualifying, consumers. The AI model may be trained to predict the likelihood the user receiving the digital component is a new consumer and/or a new high value consumer. Based on the probabilities of the user being a new consumer and/or a new high value consumer for the merchant, the bid may be dynamically adjusted. For example, when generating the digital component campaign, the merchant may include additional bid values for a new consumer and a new high value consumer. In such an example, the total bid value may be equal to:

$$Bbase + (1 - Pnc) * Pde * BCF * [((1 - Pqd) * Bde) + (Pqd * Bqd)] +$$

$$Pnc * BCF * [((1 - Phv) * Bnc) + (Phv * Bhv)]$$

In the example equation, Bbase may be equal to the base bid value, Pde may correspond to the probability the user is a disengaged consumer, Bde may correspond to the additional disengaged consumer bid value, Pdhv may correspond to the probability that the user is a qualifying disengaged consumer conditioned on the user being a disengaged consumer, Bqd may correspond to the additional qualifying disengaged consumer bid value, Pnc may be the probability that the user is a new consumer, Bnc may correspond to the additional new consumer bid value, Phv may correspond to the probability that the user is a new high value consumer, and Bhv may correspond to additional new high value consumer bid value. As shown, the equation includes BCF, which may correspond to bias correction factors. Bias correction factors may adjust, or compensate for, inaccuracies in the merchant's data, conversion reporting, or the like. While the equation, as shown, includes bias correction factors, the equation may not include bias correction factors.

According to some examples, there may be one or more input fields for additional conversion values based on whether the consumer is a disengaged consumer and/or a disengaged high value consumer. For example, input 356 may be a disengaged consumer conversion value input field. As shown in FIG. 3, the additional disengaged consumer conversion value is $6 for the given digital component campaign. In such an example, the total conversion value may be determined based on the base conversion value, e.g., the conversion value for an existing consumer, plus a percentage of the disengaged consumer conversion value. The percentage may correspond to the prediction, or probability, that the user receiving the digital is a disengaged consumer. For example, if the re-engagement system predicts the probability as 75% that the user receiving the digital component is a disengaged consumer, the disengaged consumer conversion value would be 75% of $6, e.g., $4.50. In such an example, the total conversion value would equal the base conversion value, e.g., $10, plus the resulting disengaged consumer conversion value, e.g., $4.5.

In some examples, input 358 may correspond to a disengaged high value consumer conversion value. As shown in FIG. 3, the disengaged high value consumer value is $12. Accordingly, if the re-engagement system predicts the probability as 60% that the user receiving the digital component is a disengaged high value consumer, the disengaged high value consumer value would be 60% of $12, e.g., $7.20.

As shown, the input 350 is a check box and inputs 356, 358 are text boxes. However, the input 350 and inputs 356, 358 may be a check box, drop down menu, text box, radio button, slider, or the like. The inputs 350, 356, 358, as shown, are just some examples and are not intended to be limiting.

Figure 4:
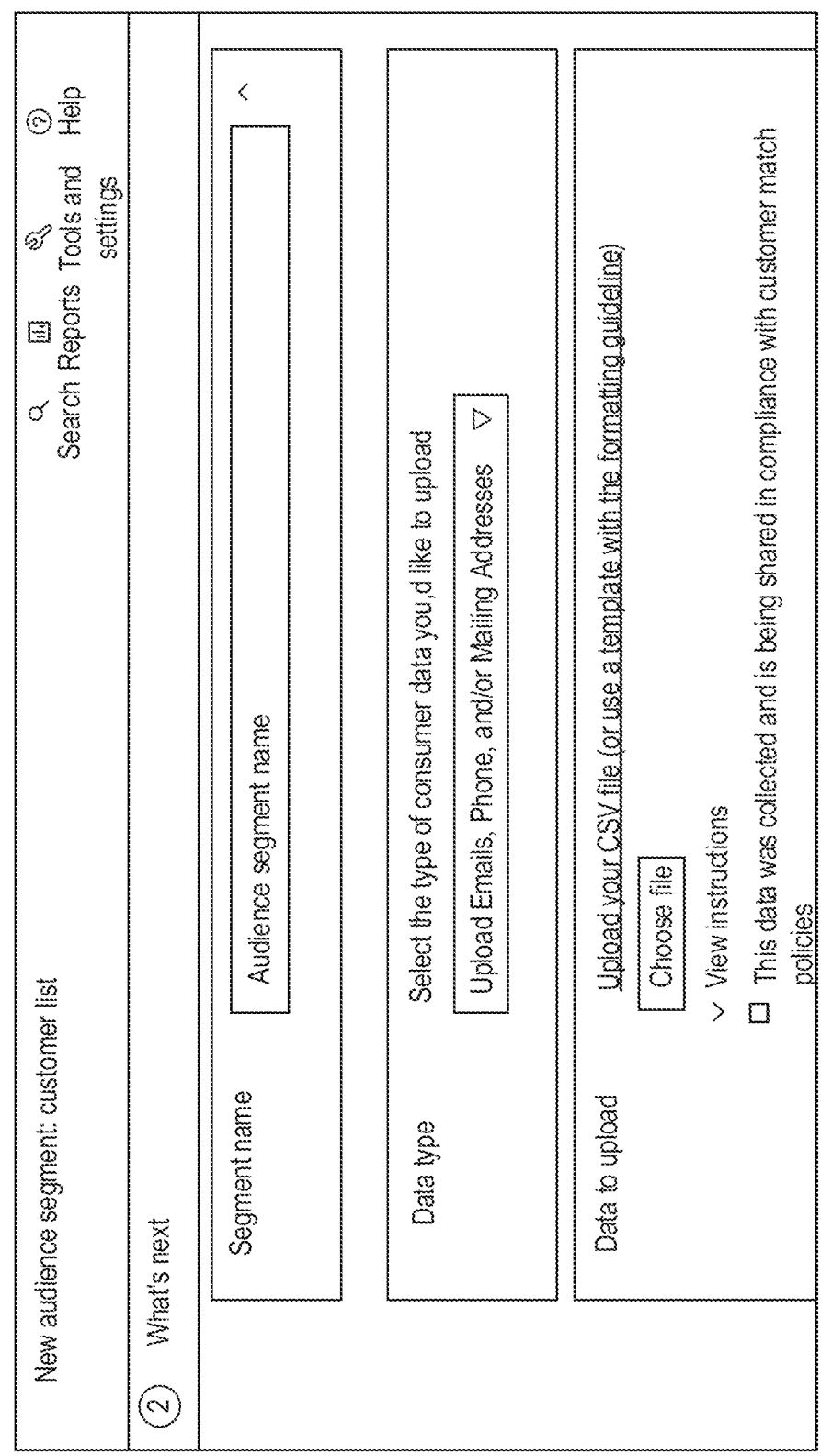
FIG. 4 is a screenshot illustrating an example user interface for providing an audience list as part of a digital component campaign according to aspects of the disclosure.

FIG. 4 is a screenshot illustrating an example user interface 400 for a merchant to provide their audience list as part of the digital component campaign. The audience list may be, for example, a consumer list of the merchant's existing consumers. The consumer list may include an indication of the consumers the merchant identifies as corresponding to high value consumers. When submitting the consumer list, the merchant may have to verify that the data within the consumer list was collected and is being shared with the system in compliance with the system's sharing policies.

Figure 5:
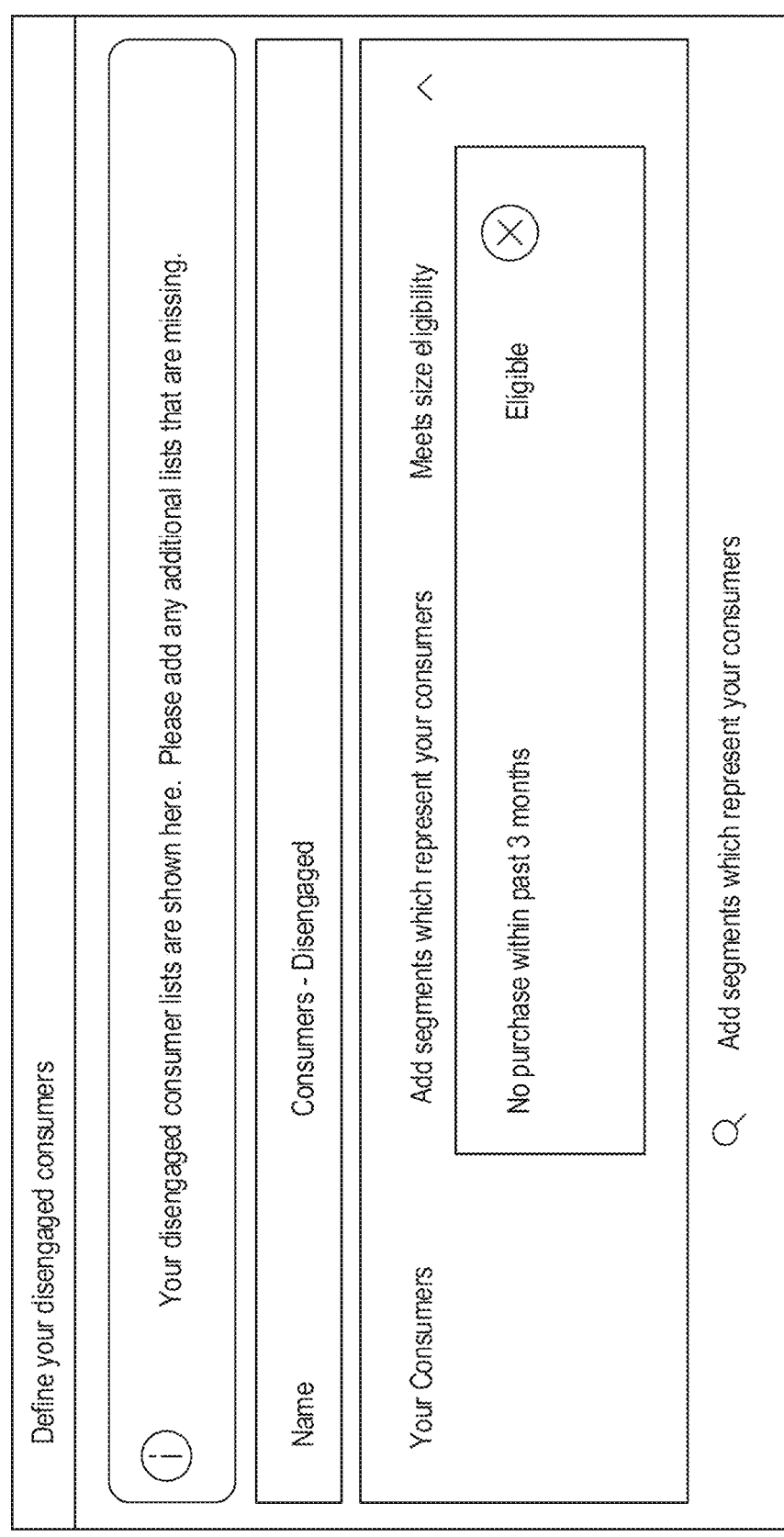
FIG. 5 is a screenshot illustrating an example user interface for identifying disengaged consumers as part of a component campaign according to aspects of the disclosure.

FIG. 5 is an example screenshot of a user interface 500 to identify a merchant's disengaged consumers when creating a digital component campaign. According to some examples, in conjunction with submitting the consumer list, the merchant may provide one or more indications identifying features for the merchant's disengaged consumers. In some examples, after the merchant submits their consumer list, features related to the merchant's disengaged consumers may be automatically identified. For example, as shown in FIG. 5, the merchant's disengaged consumers correspond to consumers who have not completed a purchase conversion within a threshold period of time, e.g., three months. In some examples, disengaged consumers may be determined based on a threshold conversion purchase value, the frequency of purchase conversions, the category of goods/services purchased, or the like. The disengagement criteria of what a merchant considers a consumer to be a disengaged consumer may be used to train the model, such as the re-engagement system in FIG. 1, to predict whether a given user is going to be a disengaged consumer and/or a disengaged high value consumer.

According to some examples, the user interface may include one or more inputs for additional criteria for identifying disengaged consumers. For example, inputs may include questions regarding how frequent purchase conversions may be completed to qualify as an active consumer as compared to a disengaged consumer, a threshold purchase conversion value to qualify as an active consumer as compared to a disengaged consumer, or the like.

Referring back to FIG. 2, after the merchant has created the digital component campaign, the digital component server may receive the digital component campaign.

In block 222, the publisher may receive a search query through the publisher's website or mobile application. The search query may be a user submitted search query. The search query may be a request for information, a search query for a particular product or type of product, or the like.

In block 224, in response to receiving the search query, the publisher may transmit a request for a digital component to the digital component server. The request for digital components may be for digital components to be displayed alongside the search request for the user's search query.

In block 226, the digital component server may predict the probability the user is a disengaged and/or disengaged high value consumer for a given merchant. The digital component server may use the re-engagement system described in conjunction with FIG. 1 to predict the probability that the user that submitted the search query and, therefore, the user that will receive the digital component is a disengaged and/or disengaged high value consumer.

According to some examples, to predict the probability that the user that submitted the search query is a disengaged and/or disengaged high value consumer the re-engagement system may receive information related to the user as input. The information related to the user may be compared with the ground truth data received as part of the campaign for a given merchant. The information related to the user may be, for example, parameters related to the user that will be used to determine whether the user is a disengaged and/or high value disengaged consumer. The information related to the user may be, for example, previous transactions and/or actual conversions associated with digital components, previous searches, clicks, engagements, installs, or the like. The information related to the user may be provided into one or more AI models to predict the likelihood that the user is a new consumer, existing consumer, high qualifying consumer, disengaged consumer, or the like.

The re-engagement system may provide, as output, a prediction as to the probability the user is a disengaged and/or disengaged high value consumer for a given merchant. The prediction may be determined based on a comparison of features associated with the user and features associated with existing consumers the merchant has identified as disengaged consumers. The features may include, for example, a threshold period of time since the last purchase conversion, a threshold purchase conversion value, a threshold period of time since the last engagement with a digital component associated with the merchant, or the like.

In block 228, the digital component server may solicit bids from digital component campaigns. Based on the prediction as to the probability that the user that will receive the digital component is a disengaged and/or disengaged high value consumer for a given merchant, the bids for the digital campaigns may be automatically adjusted. For example, if the digital component campaign is configured with a focus to re-engage consumers the merchant has identified as disengaged, the total bid for that merchant may be the merchant's base bid plus a percentage of the base bid corresponding to the predicted probability.

In block 230, after the conclusion of the bidding, the digital component server may return the winning digital component campaigns to the publisher.

In block 232, the publisher may output the digital component alongside the search results.

In block 234, the digital component server may determine one or more conversions associated with the digital component output by the publisher. Conversions may include, for example, purchases made by a user that engaged with the digital component. For example, after the publisher outputs the digital component 232, the user may engage with, such as provide an input corresponding to the selection of, the digital component. In response, the user may be directed to a website or mobile application associated with the digital component. The user may, in some examples, purchase goods or services as a result of their engagement with the digital component. The purchase of goods or services due to their engagement with the digital component output by the publisher may be a conversion.

In block 236, the digital component server may determine resulting conversion values based on the determined probability that the user is a disengaged and/or disengaged high value consumer for a given merchant. For example, if the digital component campaign included additional conversion values, such as a disengaged consumer conversion value and/or a disengaged high value consumer conversion value, the total conversion value may be the base conversion value plus a percentage of the disengaged consumer conversion value and/or the disengaged high value consumer conversion. The percentage may correspond to the probability that the user associated with the conversion is a disengaged consumer and/or a disengaged high value consumer. According to some examples, the total conversion value may be adjusted based on one or more bias correction factors. For example, the bias correction factors may account for users that make multiple purchases from a single merchant or conversion categories.

In block 238, the merchant may receive reporting from the digital component server. The reporting may include an indication of the number of conversions from the digital component campaign. The reporting may include, for example, the number of disengaged consumers and/or disengaged high value consumers. The number of disengaged consumers may be determined based on comparing the consumers that completed a conversion to the disengaged consumers identified by the merchant on the merchant's existing consumer list. In some examples, the number of disengaged consumers may be determined based on the prediction provided by the re-engagement system that the consumer is a disengaged consumer. For example, the re-engagement system may determine a probability as to whether the consumer is a disengaged value consumer. The probability may be compared to a threshold. In examples where the probability is greater than a threshold, the consumer may be determined to be a disengaged consumer for reporting purposes. In contrast, when the probability is less than the threshold, the consumer may be determined to be an existing, active consumer for reporting purposes. Existing, active consumers may be, for example, returning consumers, such as consumers who have previously engaged with digital components from the given merchant. Existing, active consumers may be consumers who continue to engage with digital components from the given merchant within the threshold period of time determined by the merchant or with a threshold frequency such that the merchant does not consider the consumers to be disengaged consumers.

According to some examples, the disengaged consumers may be further classified as disengaged high value consumers or "other" disengaged consumers. Other disengaged consumers may be, for example, disengaged consumers that do not meet the threshold of a disengaged high value consumer. Disengaged high value consumers may be determined based on the prediction provided by the re-engagement system that the consumer is a disengaged high value consumer. For example, the re-engagement system may determine a probability as to whether the consumer is a disengaged high value consumer. The probability may be compared to a threshold. In examples where the probability is greater than a threshold, the consumer may be determined to be a disengaged high value consumer for reporting purposes. In contrast, when the probability is less than the threshold, the consumer may be determined to be an "other" disengaged consumer for reporting purposes.

According to some examples, a subset of the conversions may be attributed to the digital component provided for output by the publisher. In such an example, some of the conversions reported by the digital component server may be due to the digital component whereas some of the conversions may be due to another factor, such as a user visiting the website or mobile application of the merchant independently. For purposes of reporting, a fixed factor may be used to determine whether the conversion is a high value conversion or another form of conversion. The fixed factor may be determined based on a ratio of the merchant's high value consumers to the total number of consumers. In some examples, a coin flip may be used in conjunction with the fixed factor to determine whether the conversion is a high value conversion or another type of conversion.

In some examples, when determining whether the conversions are high value conversions completed by a disengaged consumer, the digital component server may use the probabilities determined by the AI model to determine whether the conversion is a high value conversion completed by a disengaged consumer or not. For example, the probability of the user being a disengaged consumer and/or a disengaged high value consumer may be compared with a randomized number to determine whether to report the conversion as a high value conversion completed by a disengaged consumer or not. The randomized number may be any number between the range used to predict the probabilities. For example, if the probabilities are based on a range of zero to 100, the randomized number will be a number between zero and 100.

FIG. 6 illustrates an example screenshot of a user interface 600 reporting the conversions for a digital component campaign. As shown, a total number of conversions, e.g., 20, may be identified. The conversions may be further broken down into subsets based on the type of conversion, such as conversions by disengaged high value consumers, other disengaged consumers, returning consumers, and unknown consumers. A respective conversion value may be provided for each type of conversion. The conversion value may be based on the conversion values provided when the digital component campaign was created by the merchant. For example, the conversion values may include the base value, a disengaged consumer conversion value, and a disengaged high value consumer value.

According to some examples, the reporting may include a disengaged consumer lifetime value. The disengaged consumer lifetime value may correspond to the future lifetime value generated from the digital component campaign. The lifetime value generated from the digital component campaign may be based on the re-engagement of disengaged consumers, independent of the value from the immediate conversions associated with the digital component campaign.

The number of conversions and the types of conversions may be used to determine the disengaged consumer lifetime value of the digital component campaign. For example, if the base conversion value is $50, the disengaged high value consumer conversion value is $200, and the disengaged consumer conversion value is $100, the disengaged consumer lifetime value may be determined based on the number of disengaged high value consumers, e.g., 5, multiplied by the disengaged high value consumer conversion value, e.g., $200, and adding that total, e.g., $1000, to the number of disengaged consumers, e.g., 10, multiplied by the disengaged consumer conversion value, e.g., $100. In such an example, the disengaged consumer lifetime value would be $2,000.

According to some examples, the number of conversions and the types of conversions may be used to determine the overall conversion value of the digital component campaign. Using the conversion values discussed above, the overall conversion value may be the number of disengaged high value consumers, e.g., 5, multiplied by the sum of the base conversion value, e.g., $50, and the disengaged high value consumer conversion value, e.g., $200, adding that total, e.g., $1250, to the number of disengaged consumers, e.g., 10, multiplied by the sum of the base conversion value, e.g., $50, and the disengaged consumer conversion value, e.g., $100, and adding that total, e.g., $1500, to the remaining number of conversions, e.g., 5, multiplied by the base conversion value, e.g., $50. The overall conversion value for the digital component campaign is $3,000.

The technology is generally directed to determining whether a user being presented with a digital component is a new and/or new qualifying consumer at the time the digital component is being selected. A new consumer may be a consumer that has not previously engaged with a digital component of a given merchant or a consumer that has no previous conversions associated with the given merchant. A new qualifying consumer may be merchant dependent. For example, a merchant may define one or more qualifications to determine whether a consumer is a qualifying consumer. The qualifications may be, for example, the frequency of purchases, confirmation of signing up for a mailing list, total purchase price of orders, average order value, consumer lifetime value, category of goods and/or services purchased, demographics such as age, or the like. Consumers that fulfill a threshold number of qualifications may be determined to be qualifying consumers. According to some examples, the qualifications used by the merchant to identify qualifying consumers may be used to train an artificial intelligence ("AI") model to predict whether the user being presented with the digital component is a new qualifying consumer. According to some examples, a qualifying consumer may be a high value consumer.

A publisher may request a digital component to be presented to a user viewing the publisher's website or mobile application. At the time of the request, a digital component server may determine whether the user is a new consumer and/or a new high value consumer. The determination of whether the user is a new consumer and/or a new high value consumer may be made based on the merchant bidding on the digital component space. For example, a merchant may have generated a digital component campaign that included a list of existing consumers. The list may, in some examples, include an indication of consumers the merchant has determined to be high value consumers. The digital component campaign may include an additional bid values and conversion values, where the additional bid value and conversion values are to be used when a digital component is being presented to and/or engaged with by a new consumer and/or a new high value consumer.

According to some examples, the digital component server may use the merchant's list of existing consumers and high value consumers to determine a probability of the user being presented with the digital component being a new consumer and/or a high value consumer for the given merchant. For example, the digital component server may execute an AI model to predict the probability of the user being a new consumer and/or a new high value consumer for the merchant. The AI model may be, in some examples, a ML model. The AI model may be trained, at least in part, based on digital component data obtained by the digital component server from a plurality of merchants. The digital component data may include, for example, searches, engagements, installs, digital component campaign information, digital component conversion data, etc. In some examples, high conversion frequency, high average conversion values, or the like may be used to label the users as high or normal value for training the model.

According to some examples, after the AI model is trained based on digital component data, one or more parameters of the AI model may be changed, or updated, based on the digital component campaign of the merchant. For example, the parameters used by the merchant to identify high value consumers may be used to update parameters of the AI model. The parameters may, in some examples, correspond to qualifications used by the merchant to identify high value consumers. The AI model may use the merchant's existing consumer list and identified high value consumers as input. The AI model may compare the existing consumers on the merchant's list with the consumers indicated by the merchant as being high value consumers to determine qualifications that result in a consumer being identified as a new consumer and/or a new high value consumer. The AI model may use the merchant's qualifications to predict whether the user being presented with the digital component would be considered a new consumer and/or a new high value consumer. The prediction may be determined as a probability or percentage.

The prediction of the AI model may be used to dynamically adjust the bidding during an auction in response to the publisher's request for a digital component. For example, the digital component campaign may include a base bid value, an additional new consumer bid value, and an additional new high value consumer bid value. As an example, the base bid value may be $10, an additional new consumer bid value may be $15, and an additional new high value consumer bid value may be $20. The machine learning model may predict that there is a 60% chance that the user being presented the digital component is a new consumer and an 80% chance that the user being presented the digital component is a high value consumer, conditioned on the user being a new consumer. Based on the probability and the bid values provided by the merchant in the digital component campaign, the total bid value may be equal:

$$Bbase + Pnc * [((1 - Phv) * Bnc) + (Phv * Bhv)]$$

In the example equation, Bbase may be equal to the base bid value, Pnc may correspond to the probability the user is a new consumer, Bnc may correspond to the additional new consumer bid value, Phv may correspond to the probability that the user is a new high value consumer conditioned on the user being a new consumer, and Bhv may correspond to the additional new high value consumer bid value. Continuing with the example above, the total bid value may be equal to: $10+0.6*[((1-0.8)*$15)+ (0.8\*$20)]=$21.4

According to some examples, the prediction of the AI model may be used to dynamically adjust the conversion value for the user's engagement with the digital component. For example, the digital component campaign may include a base conversion value, an additional new consumer conversion value, and an additional new high value consumer value. As an example, the base conversion value may be $20, an additional new consumer conversion value may be $25, and an additional new high value consumer conversion value may be $30. The AI model may predict that there is a 75% chance that the user being presented the digital component is a new consumer. Based on the probability and the conversion values provided by the merchant in the digital component campaign, the total conversion value may be equal to the base conversion value plus the probability times the new consumer conversion value. In the example provided, this result in a total conversion value of $38.75=$20+ (0.75*$25).

When reporting conversions, the digital component server may use the probabilities determined by the AI model to determine whether the conversion is a high value conversion or not. For example, the probability of the user being a new consumer and/or a new high value consumer may be compared with a randomized number to determine whether to report the conversion as a high value conversion or not. The randomized number may be any number between the range used to predict the probabilities. For example, if the probabilities are based on a range of zero to 100, the randomized number will be a number between zero and 100. According to some examples, the probability of the user being a new consumer and/or a new high value consumer may be compared with a randomized number to assign the user as either new or not, e.g., an existing user. For example, the user may be identified as an existing consumer with probability (1−Pnc), a new/normal-value consumer with probability Pnc*(1−Phv), and/or a new/high-value consumer with probability Pnc*Phv. In some examples, the reported conversion value may correspond to the same assignment, e.g. existing, new/normal-value, new/high-value.

Identifying new and/or new high value consumers, based on the ground truth data included in the campaign, at the time of bidding allows for merchants to configure a digital component campaign to focus on obtaining new and/or new high value consumers. The ground truth data provided by the merchant characterizes consumers based on parameters, or attributes, regarding whether a given consumer is considered new and/or new high value consumers. The ground truth data is then used by the AI model to predict whether a respective consumer is going to be a new and/or new high value consumer based on the predefined ground truths provided by the merchant. For example, existing consumers may be filtered out from receiving the digital components associated with the merchant's digital component campaign as the merchant. This may reduce computational bandwidth by transmitting digital components only to users who may have not already received and/or engaged with digital components associated with a given merchant. Moreover, the ground truth data allows for a merchant to characterize a consumer based on predetermined parameters. The predetermined parameters may be parameters that are per merchant and/or per consumer based parameters that indicate that the consumer is a new and/or new high value consumer for the given merchant.

Further, by identifying new and/or new high value consumers at the time of bidding, merchants can dynamically adjust their bidding to be able to capture users who have not yet engaged with digital components associated with their components. This may increase the visibility of the merchant while reducing computational bandwidth. For example, the number of digital components that are transmitted may be reduced as the merchant is focusing their digital component campaign on a specific audience rather than transmitting digital components to all users.

Further, computational bandwidth may be reduced as the merchant may create a single campaign that can dynamically adjust to meet their needs, rather than creating multiple digital component campaigns to reach the same goals. For example, in a single digital component campaign, the merchant may be able to dynamically adjust the total bid and/or conversion value for new and/or new high value consumers instead of having to create individual digital component campaigns for each type of user.

Further, previous digital component campaigns were static such that the merchant did not have the ability to adjust campaign values based on the knowledge of the consumer because the merchant's knowledge of the consumer is typically limited. The merchants, therefore, previously made campaigns based on the little to no knowledge they had regarding the consumers and were unable to make changes without having to create a new digital component campaign. Moreover, any new digital component campaigns created by the merchant were based on information obtained regarding the consumer after the fact, which does not allow for the merchant to take into consideration information regarding future consumers.

By using AI to identify new and/or new qualifying, e.g., high value, consumers, the system can provide a reliable probability value of what the consumer represents such that the digital component campaign values can be dynamically adjusted for each consumer at the time the consumer is provided the digital component. The trained AI model may bring forward the knowledge of the target, e.g., the consumer, as opposed to the existing systems in which merchants can only correct their digital component campaigns after conversions occur. Moreover, as cookies associated with web and application browsing are being eliminated, the trained AI model can predict the type of consumer, e.g., new and/or new qualifying, and anticipate what needs to be done with the campaign. Specifically, the trained AI model may predict the type of consumer and dynamically adjust the campaign values based on the prediction.

Additionally, as at least part of the AI model may be trained and/or calibrated offline, computational bandwidth may be saved as compared to having to train, calibrate, and use the AI entirely online. This may reduce the use of network bandwidth and other resources, such as processor and memory overhead associated with training, calibrating, and using the model to predict whether the user receiving the digital component is a new and/or new high value consumer.

Figure 12:
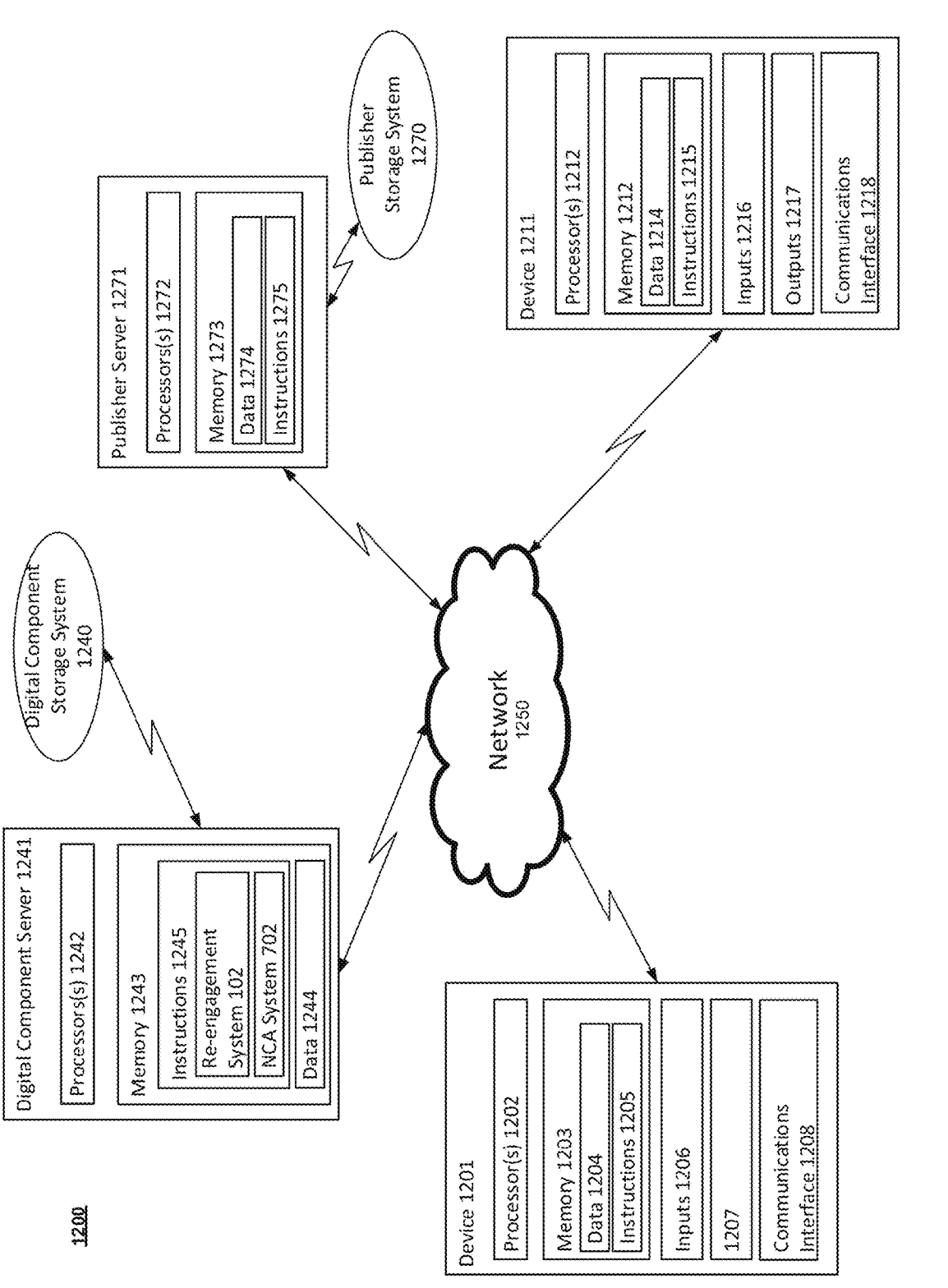
FIG. 12 is a block diagram of an example system according to aspects of the disclosure.

FIG. 12 depicts a block diagram of an example new consumer acquisition ("NCA") system, which can be implemented on one or more computing devices. The NCA system 702 may be, for example, an AI model, such as a ML model. The NCA system 702 can be configured to receive inference data and/or training data for use in predicting whether a user receiving a digital component is a new and/or new high value consumer. For example, the NCA system 702 can receive the inference data and/or training data as part of a call to an application programming interface (API) exposing the NCA system 702 to one or more computing devices. Inference data and/or training data can also be provided to the NCA system 702 through a storage medium, such as remote storage connected to the one or more computing devices over a network. Inference data 1204 and/or training data 1206 can further be provided as input through a user interface on a client computing device coupled to the NCA system 702.

The inference data 1204 can include data associated with predicting whether the user receiving the digital component is a new consumer and/or a new high value consumer. The inference data 1204 may be one or more features used to train the NCA system 702. The features may be, for example, data associated with the user, e.g., user data. The user data may be based on and/or include user searches, user engagements, user installs, etc. According to some examples, the user data may include previous transactions and/or actual conversions associated with digital components. The user activity may be features used to train the model while conversions attributed to the user activity may be used as labels to train the model.

The user data may be determined and used after the user provides authorization for the system to access and receive information related to the user's searches, clicks, engagements, installs, or the like. For example, the user may provide authorization to a website, application, or system to predict whether a user is a new consumer or a new high value consumer for a given merchant. In some examples, the user may, additionally or alternatively, provide authorization to a website, application, or system to provide personalized digital components. The authorization to predict whether the user is a new and/or new high value consumer, receive personalized digital components, or the like may be for the application to system to access one or more databases or sub databases in the memory of the device. According to one example, the user may select specific sub-databases to which the application or system is granted access. For instance, the user may grant access to the search history database but not the browser history database.

According to some examples, the inference data may include data associated with digital components collected by the NCA system 702. The data associated with the digital components may include, for example, digital component campaign information, digital component conversion data, etc. associated with respective merchants of a plurality of merchants. According to some examples, the campaign information may include bid values, indications of qualifications consumers, or the like. The inference data 1204 may be collected and/or used only after receiving authorization from the respective merchants for the NCA system to access and/or use the data associated with digital components.

The training data 1206 can correspond to an AI or ML task for predicting whether the user has a high total conversion value, such as a task performed by a neural network, similar to training data 106. In some examples, the training data can correspond to an AI or ML task for predicting one or more types of attributes associated with a high value consumer. The attributes may include, for example, high conversion frequency, high average conversion values, or the like.

According to some examples, the training data 1206 may comprise labels associated with consumers that a given merchant has identified as high-value existing consumers, normal-value existing consumers, or the like. The labeled consumers may be used to train the NCA system 702 to predict whether a consumer is a new consumer and/or a new qualifying, e.g., high value, consumer. According to some examples, the labeled consumers of a given merchant joined with the user data, e.g. the inference data, for training the NCA system 702. The training data 1206 may, in some examples, be information that can be collected in the absence of cookies to train the model such that, when similar data is available, the AI model may be able to provide a probability that the consumer is a high-value and/or new high-value consumer.

The training data 1206 can be in any form suitable for training a model, according to one of a variety of different learning techniques, similar to training data 106.

From the inference data and/or training data, one or more parameters of the first stage of the NCA system 702 can be trained. The one or more parameters of the first stage 710 of the NCA system 702 may be configured to output one or more results related to whether the user receiving the digital component is a new and/or new high value consumer for a given merchant generated as output data 714. As examples, the output data 714 can be any kind of score, classification, or regression output based on the input data, similar to output data 114. These AI or machine learning tasks can correspond to a variety of different applications in processing images, video, text, speech, or other types of data to predict whether the user receiving the digital component is a new and/or new high value consumer for a given merchant. The output data 714 can include instructions associated with whether the user receiving the digital component is a new and/or new high value consumer for a given merchant. According to some examples, the first stage 710 of the NCA system 702 may predict a probability, e.g., the probability that a user will be a qualifying, or high value, consumer for a given merchant.

According to some examples, the first stage 710 of the NCA system 702 may be trained with data from a plurality of merchants. The parameters trained at the first stage 710 of the NCA system 710 may be used in the second stage 712 of the NCA system 702. In some examples, the second stage 712 of the NCA system 702 may be used to predict the probability a user is a new consumer and/or a new high value consumer for a given merchant based on the parameters trained during the first stage 710.

In some examples, the first stage 710 of the NCA system 710 may map raw user data to a user representation, which is used by the second stage 712 of the NCA system 702. The user representation may be, in some examples, an embedding of the user's raw data into a fixed dimensional real-values space. The raw data may be, for example, user data or inference data 1206.

The second stage 712 of the NCA system 702 may adjust one or more of the one or more parameters of the first stage 710 of the NCA system 702. For example, after the one or more parameters of the first stage 710 of the NCA system 702 are trained, the parameters may be adjusted based on ground truth data 708 received from a merchant. The ground truth data 708 may include, for example, the merchant's audience list. The audience list may be a list of the merchant's existing consumers. In some examples, the audience list may include an indication of consumers the merchant considers to be high value consumers.

Associating labels of the ground truth data 708 with the features from the inference data 1204 may allow the first stage 710 and the second stage 712 to be trained using the same features, e.g., the inference data 1204, but have different labels. For example, the first stage 710 may be trained with labels corresponding to user conversion data while the second stage 712 may be trained based on merchant ground truth data 708.

According to some examples, the second stage 712 of the NCA system 702 may be adjusted and/or trained for each respective merchant. The quality of the model may be improved in the second stage 712 by leveraging the user representations learned in the first stage 710 with the merchant specific data. The merchant specific data 708 may be the ground truth data 708.

The ground truth data 708 may be, in some examples, training data used to train the second stage of the NCA system. The ground truth data 708 can respond to an artificial intelligence (AI) or machine learning task for predicting whether the user receiving the digital component is a new and/or new high value consumer for the merchant providing the ground truth data, such as a task performed by a neural network. The ground truth data 708 can be split into a training set, a validation set, and/or a testing set. An example training/validation/testing split can be an 80/10/10 split, although any other split may be possible. The ground truth data 708 can include the merchant's audience list. The audience list may include a list of existing consumers. In some examples, the audience list may include an indication of the existing consumers the merchant identifies as high value consumers.

The ground truth data 708 can be in any form suitable for training a model, according to one of a variety of different learning techniques, similar to ground truth data 108.

From the one or more parameters trained in the first stage 710 of the NCA system 702 and updated in the second stage 712 of the NCA system 702, the NCA system 702 can be configured to output one or more results related to whether the user receiving the digital component is a new and/or new high value consumer for a respective merchant generated as output data 714, similar to output data 114. These AI or machine learning tasks can correspond to a variety of different applications in processing images, video, text, speech, or other types of data to predict whether the user receiving the digital component is a new and/or new high value consumer. The output data 714 can include instructions associated with whether the user receiving the digital component is a new and/or new high value consumer.

As an example, the NCA system 702 can be configured to send the output data 714 for display on a client or user display, similar to re-engagement system 102.

As shown in FIG. 12, and discussed above, the NCA system 702 can include one or more stage models 710, 712. The stage models can be implemented as one or more computer programs, specially configured electronic circuitry, or any combination thereof. The stage models can be configured to determine, generally, whether the user is a new and/or new high value consumer or, more specifically, whether the user is a new and/or new high value consumer for a given merchant.

According to some examples, the NCA system 702 may be calibrated, or evaluated. Calibrating the model may allow for at least a portion of the NCA system, such as the first stage and/or the second stage, to be offline while still being able to predict whether the user receiving the digital component is a new and/or new high value consumer. For example, the first stage model of the NCA system 702 may generate an embedded set of numbers to represent one or more users. The second stage of the model may generate one or more embedded set of numbers to represent respective merchants. Rather than the first and/or second stage models 710, 712 of the NCA system 702 being online, the embedded numbers representing the users and/or merchants may be provided online. This may reduce the network bandwidth and other resources such as processor and memory overhead associated with predicting whether the user receiving the digital component is a new and/or new high value consumer.

According to some examples, the NCA system 702 may be updated using a feedback loop. For example, as the NCA system 702 predicts the probability of whether a consumer is a new consumer and/or a new high value consumer, the NCA system 702 may receive feedback related to the predictions. For example, if the NCA system 702 predicts that the consumer is a new high value consumer, but the consumer ultimately does not meet the qualifications of a high value consumer for the given merchant, the NCA system 702 may receive the feedback that the prediction for that consumer and merchant pairing was inaccurate. The NCA system 702 may learn from the feedback, e.g., correct and/or incorrect predictions, such that the NCA system 702 may continuously update the AI model to provide more accurate predictions.

In some examples, the first stage 710 of the NCA system 702 may be retrained based on updated attributed conversions, which are translated into training data 1206 and/or labels. The second stage 712 may be updated based on new ground truth data provided by the merchant and/or merchant provided normal-vs-high value labels for each conversion, compared against the prediction made earlier by the NCA system 702.

The predictions, or probabilities, output by the model may be used to dynamically adjust bidding at the time of auction for a digital component and/or conversion values. For example, the probability that the user receiving the digital component is a new and/or new high value consumer may be used to dynamically adjust the bidding by using the probability as a multiplier to be added to the base bid. In one example, the base bid may be $10 and the probability that the user is a new and/or new high value consumer may be 60%. At the time of auction to select a bid to present to the user in response to a publishers request, the bid may be dynamically adjusted to be the base bid, e.g., $10, plus an additional 60% of the base bid, separate new, or separate new high-value conversion value, for a total bid of $16. Similarly, the probability that the user receiving the digital component is a new and/or new high value consumer may be used to dynamically adjust the conversion values by using the probability as a multiplier of the additional new consumer conversion value and/or new high value consumer conversion value. The resulting conversion value may be added to the base conversion value to determine a total conversion value. The conversion value may be adjusted with respect to the first purchase conversion value.

Figure 8:
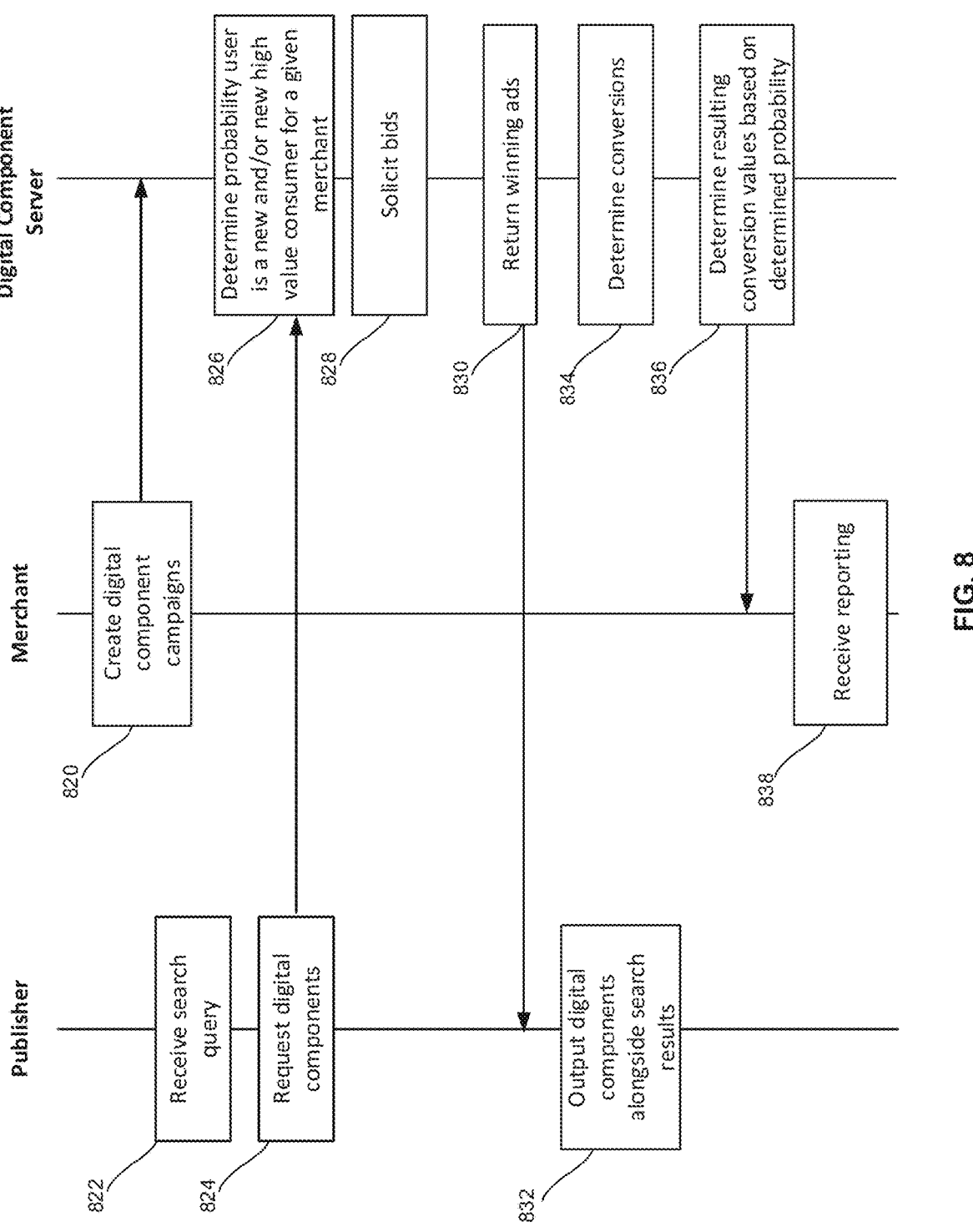
FIG. 8 is a sequence diagram according to aspects of the disclosure.

FIG. 8 is a sequence diagram of steps that may occur among a publisher, a merchant, and a digital component server. The publisher may provide content via a website or a mobile application. The merchant may be, for example, an advertiser. The digital component server may be, for example, an advertisement ("ad") server. The following operations do not have to be performed in the precise order described below. Rather, various operations can be handled in a different order or simultaneously, and operations may be added or omitted.

In block 820, the merchant may create a digital component campaign. A digital component campaign may include a digital component associated with the merchant, such as an ad, to be provided on a publisher's website or mobile application alongside the publisher's content. The digital component campaign may additionally include a bidding strategy, conversion values, target users, and the like.

Figure 9:
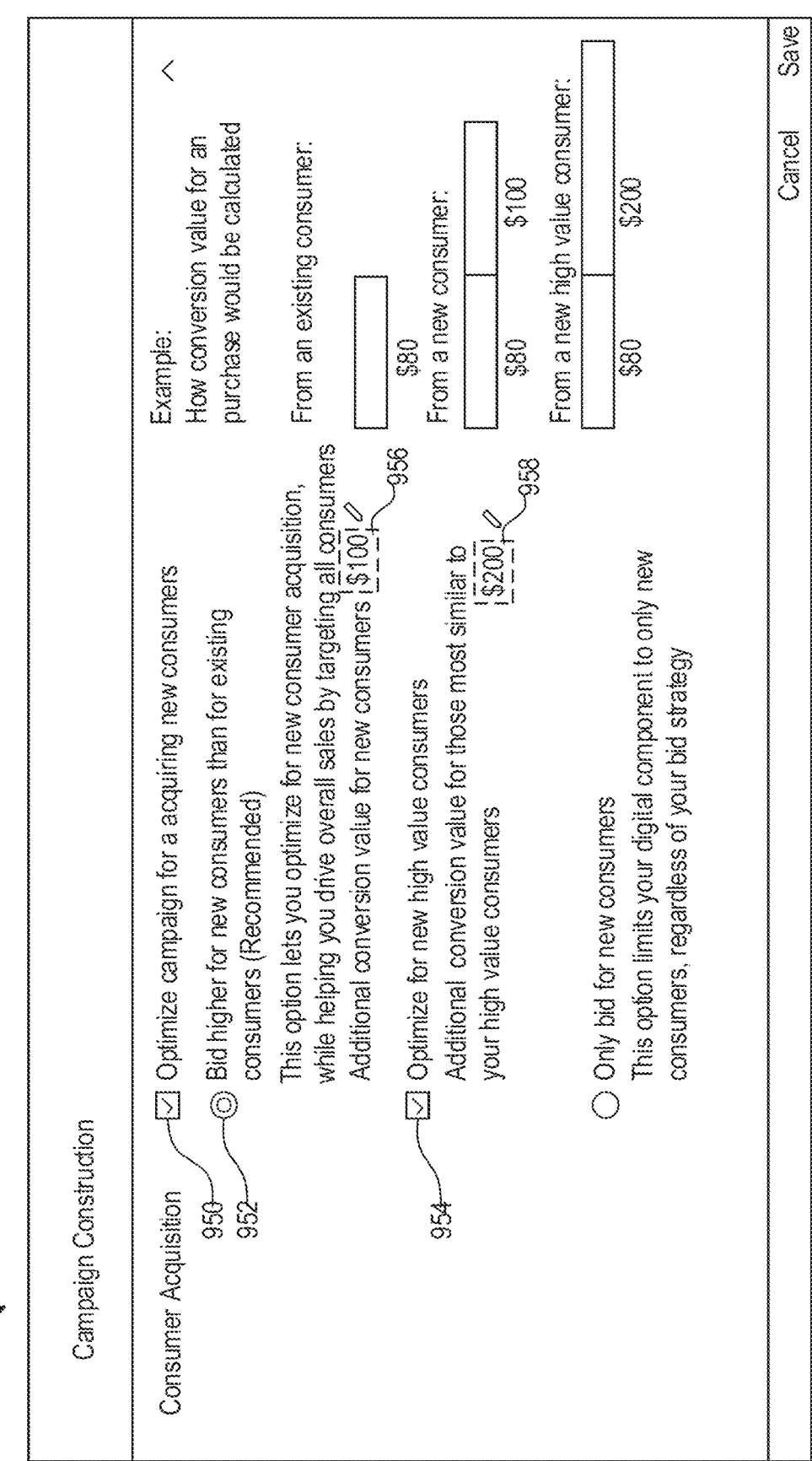
FIG. 9 is a screenshot illustrating an example user interface for creating a digital component campaign according to aspects of the disclosure.

FIG. 9 is a screenshot illustrating an example user interface 900 for creating a digital component campaign. The digital component campaign may be constructed to focus on consumer acquisition. Focusing the digital component campaign on consumer acquisition may include providing increased bids and conversion values for new and/or new high value consumers. The increased bids at the time of auction and the increased conversion values may be determined dynamically based on the prediction of whether the user receiving the digital component is a new and/or new high value consumer.

The user interface may include one or more input fields. The input fields may be configured to receive details relating to the digital component campaign. According to some examples, the inputs may correspond to a bidding strategy, bid values, conversion values, options to increase the bid and conversion values based on whether the user receiving the digital component is a new and/or new high value consumer.

As shown, input 950 may be to configure the digital component campaign to acquire new consumers. Input 952 may be for a bidding strategy to bid higher for new consumers than for existing consumers. The higher bid may be determined dynamically, and automatically, at the time of auction based on the prediction of whether the user receiving the digital component is a new and/or new high value consumer. For example, the system may receive inputs indicating that the base bid is $80, the additional new consumer bid is $60, and the additional new high value consumer bid is $70. The NCA system, described with respect to FIG. 12, may predict that there is an 75% chance that the user receiving the digital component is a new consumer and a 60% chance that the user is a new high value consumer, conditioned on the user being a new consumer. The total bid may be the base bid, e.g., $80, plus a portion of the additional new consumer bid based on the new consumer probability, e.g., 75% of $60, and a portion of the additional new high value consumer bid. According to some examples, the portion of the additional new high value consumer bid may be based on the probability, e.g., 60% of $70. In some examples, the portion of the additional new high value consumer bid may be determined as Pnc*Phv*(Bhv+Bnc), where Phv is the probability that the user is a new high value consumer and Bhv is the additional new high value consumer bid value.

According to some examples, there may be one or more input fields for additional conversion values based on whether the consumer is a new consumer and/or a new high value consumer. For example, input 956 may be a new conversion value input field. As shown in FIG. 9, the additional new consumer conversion value is $100 for the given digital component campaign. In such an example, the total conversion value may be determined based on the base conversion value, e.g., the conversion value for an existing consumer, plus a percentage of the new consumer conversion value. The percentage may correspond to the prediction, or probability, that the user receiving the digital is a new consumer. For example, if the NCA system predicts the probability as 75% that the user receiving the digital component is a new consumer, the new consumer conversion value would be 75% of $100, e.g., $75. In such an example, the total conversion value would equal the base conversion value, e.g., $80, plus the new consumer conversion value, e.g., $75. According to some examples, when reporting the conversion value, the conversion value may be reported as $80 or $80+$100, with 25% and 75% probabilities respectively. In the example provided, $80+0.75*$100 reflects the expected total conversion value.

In some examples, a selection of input 954 may configure the digital component campaign to obtain new high value consumers. Similar to the new consumer conversion value, input 958 may correspond to a new high value consumer conversion value. As shown in FIG. 9, the new high value consumer value is $200. Accordingly, if the NCA system predicts the probability as 60% that the user receiving the digital component is a new high value consumer, the new high value consumer value would be 60% of $200, e.g., $120. According to some examples, the new high value consumer value may, additionally or alternatively, be multiplied by the probability that the consumer is a new consumer. For example, if the NCA system predicts the probability as 80% that the user receiving the digital component is a new consumer and as 60% that the user receiving the digital component is a new high value consumer, the value would be determined as: 0.8*0.6(100+200).

As shown, the inputs 950, 954 are check boxes, input 952 is a radio button, and inputs 956, 958 are text boxes. However, the inputs 950, 954, input 952, and inputs 956, 958 may be a check box, drop down menu, text box, radio button, slider, or the like. The inputs 950-958 as shown are just some examples and are not intended to be limiting.

Figure 10:
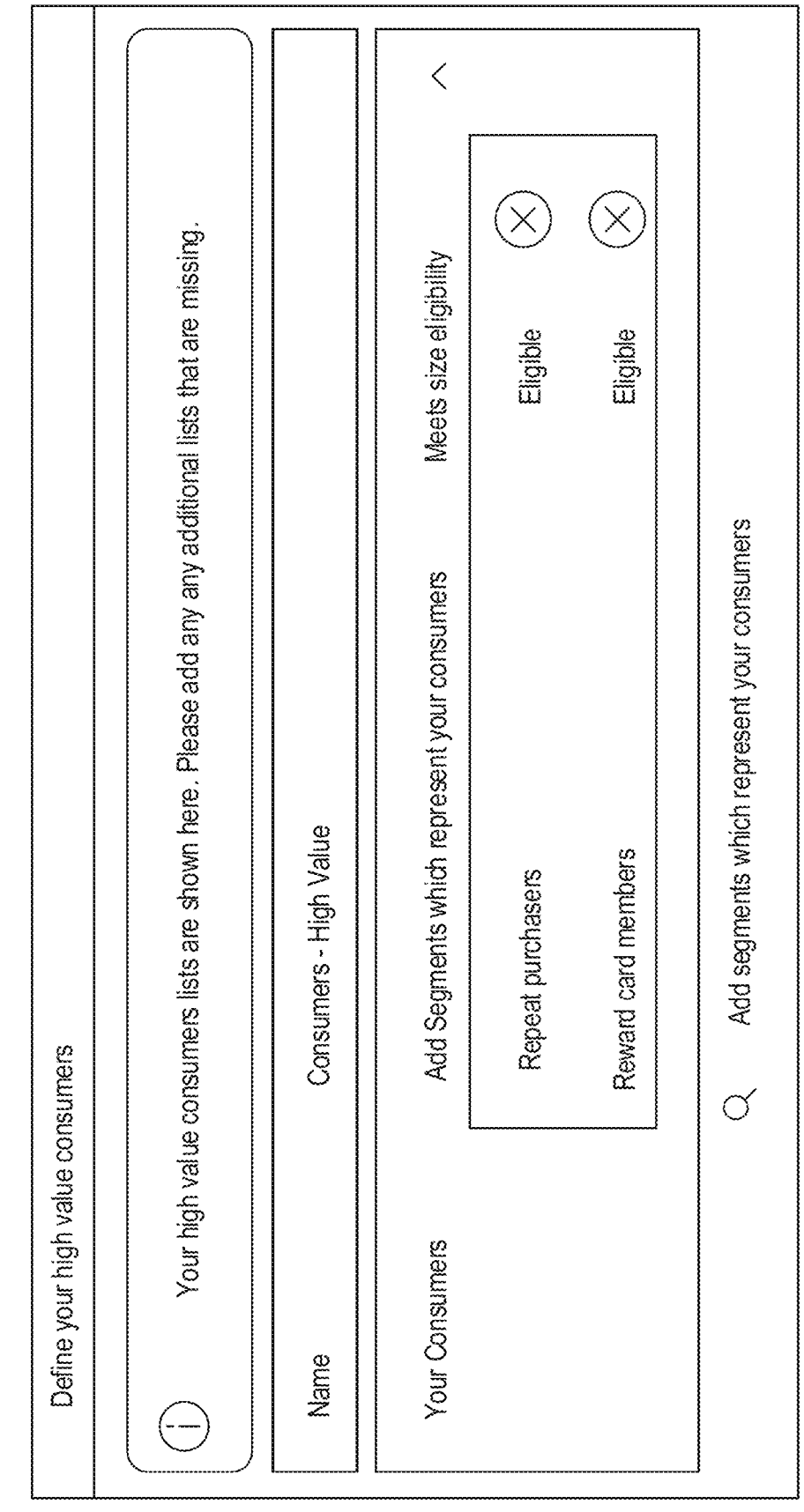
FIG. 10 is a screenshot illustrating an example user interface for identifying high value consumers as part of a component campaign according to aspects of the disclosure.

FIG. 10 is an example screenshot of a user interface 1000 to identify a merchant's high value consumers when creating a digital component campaign. According to some examples, in conjunction with submitting the consumer list, the merchant may provide one or more indications identifying features for the merchant's high value consumers. In some examples, after the merchant submits their consumer list, features related to the merchant's high value consumers may be automatically identified. For example, as shown in FIG. 10, the merchant's high value consumers correspond to consumers who are repeat purchasers, have a reward card associated with the merchant, or the like. In some examples, high value consumers may be determined based on the category of goods/services purchased, the total purchase price, demographics, such as age or location, or the like. The qualifications of what a merchant considers a consumer to be a high value consumer may be used to train the model, such as the NCA system in FIG. 12, to predict whether a given user is going to be a new consumer and/or a new high value consumer.

According to some examples, the user interface may include one or more inputs for additional criteria for identifying high value consumers. For example, inputs may include questions regarding how much more value the first purchase conversion of the new consumer should be to qualify as a new high value consumer. In some examples, the inputs may include a question regarding how much more value the first purchase conversion should be from a new consumer to quality as a high lifetime value.

Referring back to FIG. 8, after the merchant has created the digital component campaign, the digital component server may receive the digital component campaign.

In block 822, the publisher may receive a search query through the publisher's website or mobile application. The search query may be a user submitted search query. The search query may be a request for information, a search query for a particular product or type of product, or the like.

In block 824, in response to receiving the search query, the publisher may transmit a request for a digital component to the digital component server. The request for digital components may be for digital components to be displayed alongside the search request for the user's search query.

In block 826, the digital component server may predict the probability the user is a new and/or new high value consumer for a given merchant. The digital component server may use the NCA system described in conjunction with FIG. 12 to predict the probability that the user that submitted the search query and, therefore, the user that will receive the digital component is a new and/or new high value consumer.

According to some examples, to predict the probability that the user that submitted the search query is a new and/or new high value consumer the NCA system may receive information related to the user as input. The information related to the user may be compared with the ground truth data received as part of the campaign for a given merchant. The information related to the user may be, for example, parameters related to the user that will be used to determine whether the user is a new and/or new high value disengaged consumer.

The system may leverage lists of existing consumers, high value consumers, and/or existing high value consumers provided by the merchant. The system may use the provided lists to train the AI models to distinguish between these classes, e.g., existing, existing high value, disengaged, etc., based on patterns in the consumer's activity, such as searches, clicks, engagements, installs, or the like. The AI models, when executed, provide predictions for other consumers for which no ground truth was provided. Consumers for which no ground truth as provided are consumers that are not on any of the merchant provided lists.

The NCA system may provide, as output, a prediction as to the probability the user is a new and/or new high value consumer for a given merchant. The prediction may be determined based on a comparison of features associated with the user and features associated with existing consumers the merchant has identified as high value consumers. The features may include, for example, the frequency of purchases, confirmation of signing up for a mailing list, total purchase price of orders, average order value, consumer lifetime value, category of goods and/or services purchased, demographics such as age, or the like.

In block 828, the digital component server may solicit bids from digital component campaigns. Based on the prediction as to the probability that the user that will receive the digital component is a new and/or new high value consumer for a given merchant, the bids for the digital campaigns may be automatically adjusted. For example, if the digital component campaign is configured with a focus to acquire new consumers, the total bid for that merchant may be the merchant's base bid plus a percentage of the base bid corresponding to the predicted probability.

In block 830, after the conclusion of the bidding, the digital component server may return the winning digital component campaigns to the publisher.

In block 832, the publisher may output the digital component alongside the search results.

In block 834, the digital component server may determine one or more conversions associated with the digital component output by the publisher. Conversions may include, for example, purchases made by a user that engaged with the digital component. For example, after the publisher outputs the digital component 832, the user may engage with, such as provide an input corresponding to the selection of, the digital component. In response, the user may be directed to a website or mobile application associated with the digital component. The user may, in some examples, purchase goods or services as a result of their engagement with the digital component. The purchase of goods or services due to their engagement with the digital component output by the publisher may be a conversion.

In block 836, the digital component server may determine resulting conversion values based on the determined probability that the user is a new and/or new high value consumer for a given merchant. For example, if the digital component campaign included additional conversion values, such as a new consumer conversion value and/or a new high value consumer conversion value, the total conversion value may be the base conversion value plus a percentage of the new consumer conversion value and/or the new high value consumer conversion. The percentage may correspond to the probability that the user associated with the conversion is a new consumer and/or a new high value consumer.

In block 838, the merchant may receive reporting from the digital component server. The reporting may include an indication of the number of conversions from the digital component campaign. The reporting may include, for example, the number of new consumers and/or new high value consumers. The number of new consumers may be determined based on comparing the consumers to the merchant's existing consumer list. In some examples, the number of new consumers may be determined based on the prediction provided by the NCA system that the consumer is a new consumer. For example, the NCA system may determine a probability as to whether the consumer is a new value consumer. The probability may be compared to a threshold. In examples where the probability is greater than a threshold, the consumer may be determined to be a new consumer for reporting purposes. In contrast, when the probability is less than the threshold, the consumer may be determined to be an existing consumer for reporting purposes. Existing consumers may be, for example, returning consumers, such as consumers who have previously engaged with digital components from the given merchant.

According to some examples, the new consumers may be further classified as new high value consumers or "other" new consumers. Other new consumers may be, for example, new consumers that do not meet the threshold of a high value new consumer. New high value consumers may be determined based on the prediction provided by the NCA system that the consumer is a new high value consumer. For example, the NCA system may determine a probability as to whether the consumer is a new high value consumer. The probability may be compared to a threshold. In examples where the probability is greater than a threshold, the consumer may be determined to be a new high value consumer for reporting purposes. In contrast, when the probability is less than the threshold, the consumer may be determined to be an "other" new consumer for reporting purposes.

According to some examples, a subset of the conversions may be attributed to the digital component provided for output by the publisher. In such an example, some of the conversions reported by the digital component server may be due to the digital component whereas some of the conversions may be due to another factor, such as a user visiting the website or mobile application of the merchant independently. In some examples, a coin flip may be used in conjunction with the fixed factor to determine whether the conversion is a high value conversion or another type of conversion.

In some examples, when determining whether the conversions are high value conversions, the digital component server may use the probabilities determined by the machine learning model to determine whether the conversion is a high value conversion or not. For example, the probability of the user being a new consumer and/or a new high value consumer may be compared with a randomized number to determine whether to report the conversion as a high value conversion or not. The randomized number may be any number between the range used to predict the probabilities. For example, if the probabilities are based on a range of zero to 100, the randomized number will be a number between zero and 100.

FIG. 11 illustrates an example screenshot of a user interface 1100 reporting the conversions for a digital component campaign. As shown, a total number of conversions, e.g., 20, may be identified. The conversions may be further broken down into subsets based on the type of conversion, such as conversions by new high value consumers, other new consumers, returning consumers, and unknown consumers. A respective conversion value may be provided for each type of conversion. The conversion value may be based on the conversion values provided when the digital component campaign was created by the merchant. For example, the conversion values may include the base value, a new consumer conversion value, and a new high value consumer value.

According to some examples, the reporting may include a new consumer lifetime value. The new consumer lifetime value may correspond to the future lifetime value generated from the digital component campaign. The lifetime value generated from the digital component campaign may be based on the acquisition of new consumers, independent of the value from the immediate conversions associated with the digital component campaign.

The number of conversions and the types of conversions may be used to determine the new consumer lifetime value of the digital component campaign. For example, if the base conversion value is $50, the new high value consumer conversion value is $200, and the new consumer conversion value is $100, the new consumer lifetime value may be determined based on the number of new high value consumers, e.g., 5, multiplied by the new high value consumer conversion value, e.g., $200, and adding that total, e.g., $1000, to the number of new consumers, e.g., 10, multiplied by the new consumer conversion value, e.g., $100. In such an example, the new consumer lifetime value would be $2,000.

According to some examples, the number of conversions and the types of conversions may be used to determine the overall conversion value of the digital component campaign. Using the conversion values discussed above, the overall conversion value may be the number of new high value consumers, e.g., 5, multiplied by the sum of the base conversion value, e.g., $50, and the new high value consumer conversion value, e.g., $200, adding that total, e.g., $1250, to the number of new consumers, e.g., 10, multiplied by the sum of the base conversion value, e.g., $50, and the new consumer conversion value, e.g., $100, and adding that total, e.g., $1150, to the remaining number of conversions, e.g., 5, multiplied by the base conversion value, e.g., $50. The overall conversion value for the digital component campaign is $3,000.

Example Systems

FIG. 12 illustrates an example system in which the features described above and herein may be implemented. It should not be considered as limiting the scope of the disclosure or usefulness of the features described herein. In this example, system 1200 includes devices 1201, 711, digital component servers 1241, digital component server storage system 1240, publisher server 1271, publisher storage system 1270, and network 1250. For purposes of clarity, devices 1201, 711 will be described with respect to device 1201. However, it should be understood that device 711 may include the same or similar components and may function in substantially the same way.

Device 1201 may include one or more processors 1202, memory 1203, data 1204 and instructions 1205. Device 1201 may also include inputs 1206, outputs 1207, and a communications interface 1208. The devices 1201 may be, for example, a smart phone, tablet, laptop, smart watch, AR/VR headset, smart helmet, home assistant, etc.

Memory 1203 of device 1201 may store information that is accessible by processor 1202. Memory 1203 may also include data that can be retrieved, manipulated or stored by the processor 1202. The memory 1203 may be of any non-transitory type capable of storing information accessible by the processor 1202, including a non-transitory computer-readable medium, or other medium that stores data that may be read with the aid of an electronic device, such as a hard-drive, memory card, read-only memory ("ROM"), random access memory ("RAM"), optical disks, as well as other write-capable and read-only memories. Memory 1203 may store information that is accessible by the processors 1202, including instructions 1205 that may be executed by processors 1202, and data 1204.

Data 1204 may be retrieved, stored or modified by processors 1202 in accordance with instructions 1205. For instance, although the present disclosure is not limited by a particular data structure, the data 1204 may be stored in computer registers, in a relational database as a table having a plurality of different fields and records, XML documents, or flat files. The data 1204 may also be formatted in a computer-readable format such as, but not limited to, binary values, ASCII or Unicode. By further way of example only, the data 1204 may comprise information sufficient to identify the relevant information, such as numbers, descriptive text, proprietary codes, pointers, references to data stored in other memories (including other network locations) or information that is used by a function to calculate the relevant data.

The instructions 1205 can be any set of instructions to be executed directly, such as machine code, or indirectly, such as scripts, by the processor 1202. In that regard, the terms "instructions," "application," "steps," and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

The one or more processors 1202 may include any conventional processors, such as a commercially available CPU or microprocessor. Alternatively, the processor can be a dedicated component such as an ASIC or other hardware-based processor. Although not necessary, device 1201 may include specialized hardware components to perform specific computing functions faster or more efficiently.

Although FIG. 12 functionally illustrates the processor, memory, and other elements of device 1201 as being within the same respective blocks, it will be understood by those of ordinary skill in the art that the processor or memory may actually include multiple processors or memories that may or may not be stored within the same physical housing. Similarly, the memory may be a hard drive or other storage media located in a housing different from that of device 1201. Accordingly, references to a processor or device will be understood to include references to a collection of processors or devices or memories that may or may not operate in parallel.

The inputs 1206 may be, for example, a mouse, keyboard, touch-screen, microphone, or any other type of input. The inputs may receive key words for a search on a publisher's website or mobile application.

Output 1207 may be a display, such as a monitor having a screen, a touch-screen, a projector, or a television. The display 1207 of the device 1201 may electronically display information to a user via a graphical user interface ("GUI") or other types of user interfaces. For example, display 1207 may electronically display product information and sponsored ads on a publisher's website or mobile application.

The devices 1201 can be at various nodes of a network 1250 and capable of directly and indirectly communicating with other nodes of network 1250. Although two devices are depicted in FIG. 12, it should be appreciated that a typical system can include one or more computing devices, with each computing device being at a different node of network 1250.

System 1200 may include one or more server computing devices, such as digital component server 1241 and publisher server 1271. The server computing devices may be, for example, a load balanced server farm, that exchange information with different nodes of a network for the purpose of receiving, processing and transmitting the data to and from other computing devices. For instance, digital component server 1241 and publisher server 1271 may be a web server that is capable of communicating with the device 1201 via the network 1250. In addition, digital component server 1241 and publisher server 1271 may use network 1250 to transmit and present information to a user of device 1201. Digital component server 1241 and publisher server 1271 may include one or more processors 1242, 1272, memory 1243, 773, data 1244, 1274, instructions 745, 1275, etc. These components operate in the same or similar fashion as those described above with respect to device 1201.

Instructions 745 of the digital component server can include instructions for implementing a re-engagement system 102, which can correspond to the re-engagement system of FIG. 1 and/or NCA system 702, which can correspond to the NCA system of FIG. 12. The re-engagement system 746 and/or NCA system 702 can be executed using the processors, and/or using other processors remotely located from the digital component server 1241.

In some implementations, the techniques disclosed herein enable artificial intelligence to predict whether a consumer being presented a digital component is a new and/or new high value consumer and, based on the prediction, dynamically adjust a bid value and/or a conversion value associated with the digital component. Artificial intelligence (AI) is a segment of computer science that focuses on the creation of models that can perform tasks with little to no human intervention. Artificial intelligence systems can utilize, for example, machine learning, natural language processing, and computer vision. Machine learning, and its subsets, such as deep learning, focus on developing models that can infer outputs from data. The outputs can include, for example, predictions and/or classifications. Natural language processing focuses on analyzing and generating human language. Computer vision focuses on analyzing and interpreting images and videos. Artificial intelligence systems can include generative models that generate new content, such as images, videos, text, audio, and/or other content, in response to input prompts and/or based on other information.

Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some machine-learned models can include multi-headed self-attention models (e.g., transformer models).

The model(s) can be trained using various training or learning techniques. The training can implement supervised learning, unsupervised learning, reinforcement learning, etc. The training can use techniques such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations. A number of generalization techniques (e.g., weight decays, dropouts) can be used to improve the generalization capability of the models being trained.

The model(s) can be pre-trained before domain-specific alignment. For instance, a model can be pretrained over a general corpus of training data and fine-tuned on a more targeted corpus of training data. A model can be aligned using prompts that are designed to elicit domain-specific outputs. Prompts can be designed to include learned prompt values (e.g., soft prompts). The trained model(s) may be validated prior to their use using input data other than the training data, and may be further updated or refined during their use based on additional feedback/inputs.

Digital component server 1241 may manage content, such as digital components, and provide various services to the merchants, publishers, and devices 1201. According to some examples, digital component server 1241 may receive digital component campaigns from one or more merchants, such as advertisers. The digital component campaigns may include campaign information, such as the bidding strategy, conversion values, targeting information, duration, etc. The bidding strategies may include additional bids to be dynamically applied by the digital component server 1241 during auction for a digital component. In some examples, the conversion values may include additional conversion values, such as a new consumer conversion value, new high value consumer conversion value, disengaged consumer conversion value and/or a disengaged high value consumer conversion value, to be dynamically applied by the digital component server 1241 at the time of conversion and/or reporting. The digital component campaigns may be stored in the memory 1243 of digital component server 1241 and/or in digital component server storage system 1240.

According to some examples, publisher server 1271 may receive a search query from device 1201. For example, the search query may be for content. In response to the request, publisher server 1271 may retrieve relevant content from publisher storage system 1270. The publisher server 1271 may transmit a content page or other presentation, representation, or characterization of the content to the requesting device 1201. The content page may include, for example, one or more digital components.

According to some examples, in response to the received search query, publisher server 1271 may transmit a request for digital components to digital component server 1241. Digital component server 1241 may facilitate the identification of relevant digital components for distribution to the publishers.

According to some examples, digital component server 1241 may predict, using re-engagement system 746, whether the user receiving the digital component from the publisher is a disengaged consumer and/or a disengaged high value consumer for the respective merchant. The prediction may be, in some examples, a probability or percentage of likelihood that the user is a disengaged consumer and/or a disengaged high value consumer. Based on the prediction, the digital component server 1241 may dynamically adjust bidding values for merchants who provided additional bidding values in their digital component campaigns. For example, the digital component server 1241 may dynamically increase bids for merchants that included an additional bid value for disengaged consumers.

According to some examples, digital component server 1241 may predict, using NCA system 702, whether the user receiving the digital component from the publisher is a new consumer and/or a new high value consumer for the respective merchant. The prediction may be, in some examples, a probability or percentage of likelihood that the user is a new consumer and/or a new high value consumer. Based on the prediction, the digital component server 1241 may dynamically adjust bidding values for merchants who provided additional bidding values in their digital component campaigns. For example, the digital component server 1241 may dynamically increase bids for merchants that included an additional bid value for new consumers.

Device 1201 may present in a viewer, such as a browser, mobile application, or other content display system, the search query results integrated with one or more of the digital components provided by the digital component server 1241.

The devices 1201, 711, the digital component server 1241, the digital component storage system 1240, the publisher server 1271, the publisher storage system 1270, can be capable of direct and indirect communication over the network. For example, using a network socket, the client computing device can connect to a service operating in the data center through an Internet protocol. The devices can set up listening sockets that may accept an initiating connection for sending and receiving information. The network itself can include various configurations and protocols including the Internet, World Wide Web, intranets, virtual private networks, wide area networks, local networks, and private networks using communication protocols proprietary to one or more companies. The network can support a variety of short- and long-range connections. The short- and long-range connections may be made over different bandwidths, such as 2.402 GHz to 2.480 GHz, commonly associated with the Bluetooth® standard, 2.4 GHz and 5 GHz, commonly associated with the Wi-Fi® communication protocol; or with a variety of communication standards, such as the LTER standard for wireless broadband communication. The network, in addition or alternatively, can also support wired connections between the devices and the data center, including over various types of Ethernet connection. Although certain advantages are obtained when information is transmitted or received as noted above, other aspects of the subject matter described herein are not limited to any particular manner of transmission.

Although a single digital computing server 1241 and publisher server 1271 are shown in FIG. 12 along with two devices 1201, 711, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device connected to hardware accelerators configured for processing optimization models, and any combination thereof.

Example Methods

FIG. 13 depicts a flow diagram of an example process for dynamically adjusting bid values and/or conversion values. The example process can be performed, at least in part, on a system of one or more processors in one or more locations, such as the re-engagement system of FIG. 1. The following operations do not have to be performed in the precise order described below. Rather, various operations can be handled in a different order or simultaneously, and operations may be added or omitted.

In block 1310, digital component campaign information may be received from a merchant. The merchant may be, for example, an advertiser. The digital component campaign information may include, for example, a base conversion value, one or more additional conversion values, a base bid value, one or more additional bid values, and ground truth data indicating one or more qualifying consumers. The additional conversion values may include, for example, a disengaged consumer conversion value or a qualifying disengaged consumer conversion value. The additional bid values may include, for example, a disengaged consumer bid value or a qualifying disengaged consumer bid value. In some examples, the ground truth data may be an audience list of the merchant. The audience list may be a list of the merchant's existing consumers. The audience list may include an indication of the merchant's disengaged consumers.

The one or more disengaged consumers may be determined based on disengagement criteria to determine whether an existing consumer of the merchant is a disengaged consumer. The disengagement criteria may be predefined by the merchant. The disengagement criteria may include, for example, a threshold period of time since the consumer's previous purchase conversion, a threshold period of time since the consumer's previous engagement with a digital component, a minimum purchase conversion value, or the like. According to some examples, when the existing consumer fulfills a threshold number of disengagement criteria, the existing consumer may be indicated as a disengaged consumer. A qualifying disengaged consumer may be a disengaged high value consumer. A high value consumer may be determined based on value qualifications. The value qualifications may be predefined by the merchant. The value qualifications may include, for example, frequency of purchases, confirmation of signing up for a mailing list, total purchase price of orders, average order value, consumer lifetime value, category of goods and/or services purchased, demographics such as age, or the like. When the existing consumer fulfills a threshold number of value qualifications, the existing consumer may be indicated as a qualifying consumer. A qualifying disengaged consumer may, therefore, fulfill a threshold number of disengagement criteria and value qualifications to be identified as a disengaged qualified consumer.

In block 1320, a request for a digital component may be received from a publisher. The publisher may request the digital component after receiving a search query from a user.

In block 1330, a probability that a consumer being presented with the digital component is at least one of a disengaged consumer or a qualifying disengaged consumer may be determined. The probability may be determined based on the request of the digital component. For example, the probability may be determined for the user that submitted the search query to the publisher. According to some examples, a probability that the consumer being presented with the digital component is a disengaged consumer may be determined. Additionally, or alternatively, a probability that the consumer being presented with the digital component is a qualifying disengaged consumer may be determined. Determining the probability that the consumer being presented with the digital component is the at least one of a disengaged consumer or a qualifying disengaged consumer occurs at a time of bidding to select the digital component in response to the received request.

According to some examples, determining the probability that the consumer is a disengaged consumer or a qualifying disengaged consumer comprises executing a AI model. The AI model may be trained using one or more signals as inputs. According to some examples, the signals may comprise the ground truth data provided by the merchant when generating the digital component campaign. For example, the AI model may be trained to determine a probability that the consumer being presented with the digital component is a disengaged consumer and/or qualifying disengaged consumer for the given merchant based on the merchant's existing consumers and the indications of qualifying consumers for the merchant. The AI model may be trained to provide a prediction whether the consumer being presented with the digital component is at least one of the disengaged consumer or the qualifying disengaged consumer. The prediction may be provided as at least one of a disengaged consumer probability or a qualifying disengaged consumer probability.

In block 1340, at least one of a resulting bid value or a resulting conversion value associated with the digital component may be dynamically adjusted based on the determined probability and the one or more additional bid values or the one or more additional conversion values. For example, the resulting bid value may be dynamically adjusted by multiplying the probability of the consumer being presented with the digital component being a disengaged consumer or a qualifying disengaged consumer with the respective disengaged consumer bid value or qualifying disengaged consumer bid value. In some examples, the resulting bid value may be added to the base bid value to obtain a total bid value. In other examples, the resulting conversion value may be dynamically adjusted by multiplying the probability of the consumer being presented with the digital component being a disengaged consumer or a qualifying disengaged consumer with the respective disengaged consumer conversion value or qualifying disengaged consumer conversion value. The resulting conversion value may, in some examples, be added to the base conversion value to obtain a total bid value.

According to some examples, whether a conversion is a disengaged consumer conversion or a qualifying disengaged consumer conversion may be determined. The type of conversion may be determined, at least in part, based on the determined probability. For example, the determined probability may be compared to a randomized number. In some examples, the determined probability may be the qualifying disengaged consumer probability. The randomized number may be determined as a coin flip. In examples where the randomized number is less than the qualifying disengaged consumer probability, the conversion may correspond to a qualifying disengaged consumer conversion. In contrast, when the randomized number is greater than the qualifying disengaged consumer probability, the conversion may correspond to another type of conversion. For example, the conversion may be a disengaged consumer conversion, an existing consumer conversion, or an unknown consumer conversion.

By predicting whether a consumer being presented with the digital component is a disengaged consumer and/or a qualifying disengaged consumer at the time of auction of the digital component may allow for bids to be dynamically adjusted at the time of bidding. This may reduce the number of digital component campaigns a given merchant has to generate to reach specific consumers, such as disengaged consumers and/or qualifying disengaged consumers. Reducing the number of digital component campaigns reduces the computational needs of the system, such as by reducing the amount of processing power to review the digital component campaigns during bidding and reducing the memory requirement for storing additional digital component campaigns.

Further, by using an AI model to predict whether the consumer being presented with the digital component is a disengaged consumer and/or a qualifying disengaged consumer, the probabilities determined for each consumer are merchant specific. Additionally, as at least part of the AI model may be trained and/or calibrated offline, such that computational bandwidth may be saved as compared to having to train, calibrate, and use the AI model entirely online.

Figure 7:
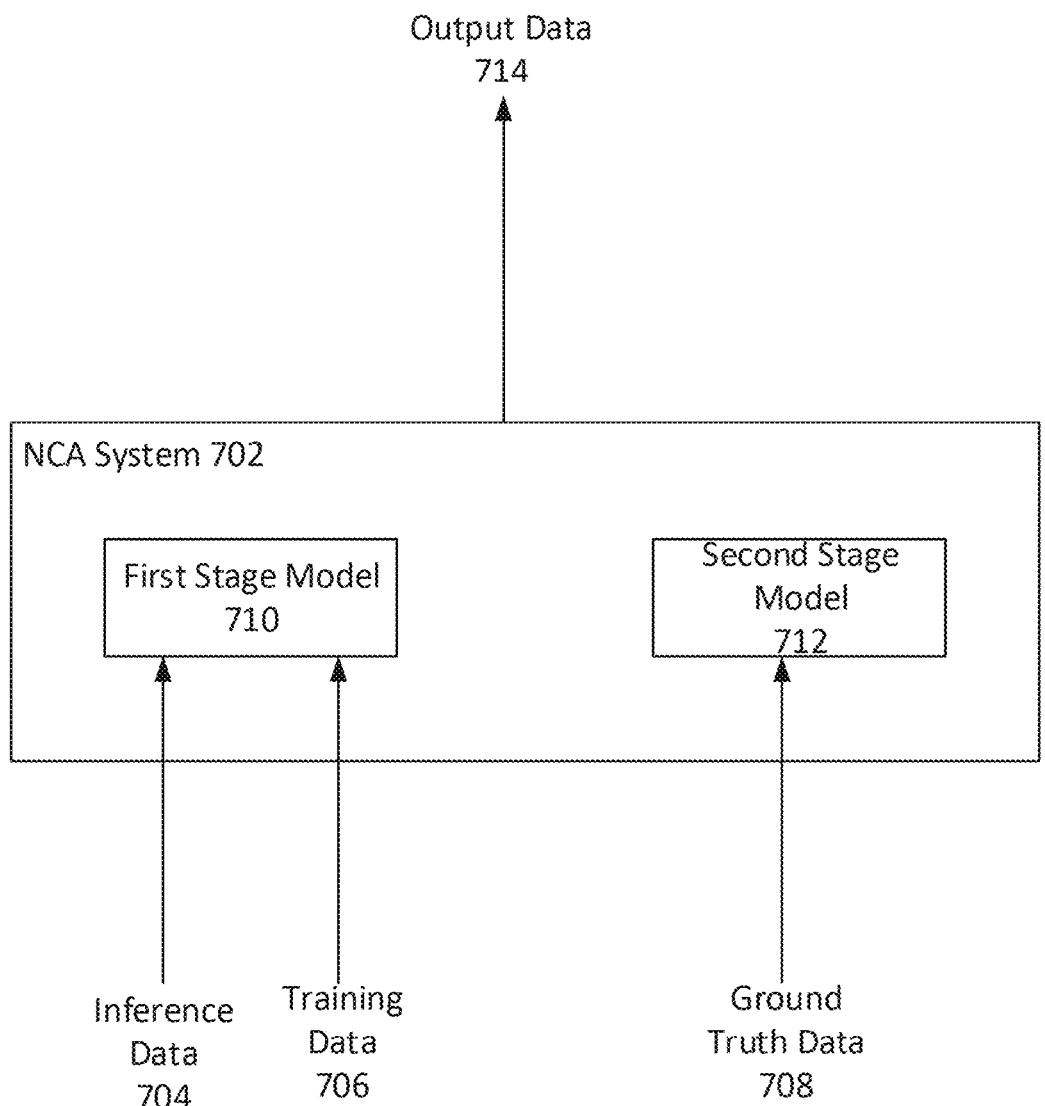
FIG. 7 is a block diagram of an example new consumer acquisition system according to aspects of the disclosure.

FIG. 14 depicts a flow diagram of an example process for dynamically adjusting bid values and/or conversion values. The example process can be performed, at least in part, on a system of one or more processors in one or more locations, such as the NCA system of FIG. 7. The following operations do not have to be performed in the precise order described below. Rather, various operations can be handled in a different order or simultaneously, and operations may be added or omitted.

In block 1410, digital component campaign information may be received from a merchant. The merchant may be, for example, an advertiser. The digital component campaign information may include, for example, a base conversion value, one or more additional conversion values, a base bid value, one or more additional bid values, and ground truth data indicating one or more qualifying consumers. The additional conversion values may include, for example, a new consumer conversion value or a new qualifying consumer conversion value. The additional bid values may include, for example, a new consumer bid value or a new qualifying consumer bid value. In some examples, the ground truth data may be an audience list of the merchant. The audience list may be a list of the merchant's existing consumers. The audience list may include an indication of the merchant's qualifying consumers.

The one or more qualifying consumers may be determined based on a set of qualifications to determine whether an existing consumer of the merchant is a qualifying consumer. The set of qualifications may be predefined by the merchant. The qualifications may include, for example, the frequency of purchases, confirmation of signing up for a mailing list, total purchase price of orders, average order value, consumer lifetime value, category of goods and/or services purchased, demographics such as age, or the like. According to some examples, when the existing consumer fulfills a threshold number of qualifications, the existing consumer may be indicated as a qualifying consumer. In some examples, a qualifying consumer may be a high value consumer.

In block 1420, a request for a digital component may be received from a publisher. The publisher may request the digital component after receiving a search query from a user.

In block 1430, a probability that a consumer being presented with the digital component is at least one of a new consumer or a new qualifying consumer may be determined. The probability may be determined based on the request of the digital component. For example, the probability may be determined for the user that submitted the search query to the publisher. According to some examples, a probability that the consumer being presented with the digital component is a new consumer may be determined. Additionally, or alternatively, a probability that the consumer being presented with the digital component is a new qualifying consumer may be determined. Determining the probability that the consumer being presented with the digital component is the at least one of a new consumer or a new qualifying consumer occurs at a time of bidding to select the digital component in response to the received request.

According to some examples, determining the probability that the consumer is a new consumer or a new qualifying consumer comprises executing a machine learning model. The machine learning model may be trained using one or more signals as inputs. According to some examples, the signals may comprise the ground truth data provided by the merchant when generating the digital component campaign. For example, the machine learning model may be trained to determine a probability that the consumer being presented with the digital component is a new consumer and/or new qualifying consumer for the given merchant based on the merchant's existing consumers and the indications of qualifying consumers for the merchant. The machine learning model may be trained to provide a prediction whether the consumer being presented with the digital component is at least one of the new consumer or the new qualifying consumer. The prediction may be provided as at least one of a new consumer probability or a new qualifying consumer probability.

In block 1440, at least one of a resulting bid value or a resulting conversion value associated with the digital component may be dynamically adjusted based on the determined probability and the one or more additional bid values or the one or more additional conversion values. For example, the resulting bid value may be dynamically adjusted by multiplying the probability of the consumer being presented with the digital component being a new consumer or a new qualifying consumer with the respective new consumer bid value or new qualifying consumer bid value. In some examples, the resulting bid value may be added to the base bid value to obtain a total bid value. In other examples, the resulting conversion value may be dynamically adjusted by multiplying the probability of the consumer being presented with the digital component being a new consumer or a new qualifying consumer with the respective new consumer conversion value or new qualifying consumer conversion value. The resulting conversion value may, in some examples, be added to the base conversion value to obtain a total bid value.

According to some examples, whether a conversion is a new consumer conversion or a new qualifying consumer conversion may be determined. The type of conversion may be determined, at least in part, based on the determined probability. For example, the determined probability may be compared to a randomized number. In some examples, the determined probability may be the new qualifying consumer probability. The randomized number may be determined as a coin flip. In examples where the randomized number is less than the new qualifying consumer probability, the conversion may correspond to a new qualifying consumer conversion. In contrast, when the randomized number is greater than the new qualifying consumer probability, the conversion may correspond to another type of conversion. For example, the conversion may be a new consumer conversion, an existing consumer conversion, or an unknown consumer conversion.

By predicting whether a consumer being presented with the digital component is a new consumer and/or a new qualifying consumer at the time of auction of the digital component may allow for bids to be dynamically adjusted at the time of bidding. This may reduce the number of digital component campaigns a given merchant has to generate to reach specific consumers, such as new consumers and/or new qualifying consumers. Reducing the number of digital component campaigns reduces the computational needs of the system, such as by reducing the amount of processing power to review the digital component campaigns during bidding and reducing the memory requirement for storing additional digital component campaigns.

Further, by using a machine learning model to predict whether the consumer being presented with the digital component is a new consumer and/or a new qualifying consumer, the probabilities determined for each consumer are merchant specific. Additionally, as at least part of the machine learning model may be trained and/or calibrated offline, such that computational bandwidth may be saved as compared to having to train, calibrate, and use the machine learning model entirely online.

FIG. 15 depicts a flow diagram of an example process for identifying new and/or new qualifying consumers. The example process can be performed, at least in part, on a system of one or more processors in one or more locations, such as the NCA system of FIG. 7. The following operations do not have to be performed in the precise order described below. Rather, various operations can be handled in a different order or simultaneously, and operations may be added or omitted.

In block 1510, an artificial intelligence (AI) model may be trained to predict whether the consumer is the new consumer or the new qualifying consumer, wherein the one or more signals comprise features associated with previously identified high value consumers. The one or more signals may further comprise an audience list indicating at least one of existing consumers or qualifying consumers. According to some examples, when the existing consumer fulfills a threshold number of qualifications of the set of qualification, the existing consumer is a qualifying consumer In block 920, a request for a digital component to be provided for output to the consumer may be received from a publisher.

In block 1530, data associated with the consumer may be provided as input into the AI model. The data associated with the consumer may include at least one of consumer searches, consumer engagements, or consumer installs. According to some examples, digital component data may be provided as input into the AI model. The digital component data may include, for example, at least one of conversion values, bid values, targeting information, or duration.

In block 1540, a probability that the consumer being presented with the digital component is at least one of the new consumer or the new qualifying consumer may be determined by executing the model. The determination may be based on the request for the digital component and the data associated with the consumer. According to some examples, when determining the probability the consumer being presented with the digital component is at least one of the new consumer or the new qualifying consumer the AI model is configured to compare the data associated with the consumer and the one or more signals.

Aspects of this disclosure can be implemented in digital electronic circuitry, in tangibly-embodied computer software or firmware, and/or in computer hardware, such as the structure disclosed herein, their structural equivalents, or combinations thereof. Aspects of this disclosure can further be implemented as one or more computer programs, such as one or more modules of computer program instructions encoded on a tangible non-transitory computer storage medium for execution by, or to control the operation of, one or more data processing apparatus. The computer storage medium can be a machine-readable storage device, a machine-readable storage substrate, a random or serial access memory device, or combinations thereof. The computer program instructions can be encoded on an artificially generated propagated signal, such as a machine-generated electrical, optical, or electromagnetic signal, that is generated to encode information for transmission to suitable receiver apparatus for execution by a data processing apparatus.

The term "configured" is used herein in connection with systems and computer program components. For a system of one or more computers to be configured to perform particular operations or actions means that the system has installed on it software, firmware, hardware, or a combination thereof that cause the system to perform the operations or actions. For one or more computer programs to be configured to perform particular operations or actions means that the one or more programs include instructions that, when executed by one or more data processing apparatus, cause the apparatus to perform the operations or actions.

The term "data processing apparatus" refers to data processing hardware and encompasses various apparatus, devices, and machines for processing data, including programmable processors, computers, or combinations thereof. The data processing apparatus can include special purpose logic circuitry, such as a field programmable gate array (FPGA) or an application specific integrated circuit (ASIC). The data processing apparatus can include code that creates an execution environment for computer programs, such as code that constitutes processor firmware, a protocol stack, a database management system, an operating system, or combinations thereof.

The data processing apparatus can include special-purpose hardware accelerator units for implementing AI models to process common and compute-intensive parts of AI training or production, such as inference or workloads. AI and/or ML models can be implemented and deployed using one or more machine learning frameworks, such as a TensorFlow framework, a Microsoft Cognitive Toolkit framework, an Apache Singa framework, or an Apache MXNet framework, or combinations thereof.

The term "computer program" refers to a program, software, a software application, an app, a module, a software module, a script, or code. The computer program can be written in any form of programming language, including compiled, interpreted, declarative, or procedural languages, or combinations thereof. The computer program can be deployed in any form, including as a stand alone program or as a module, component, subroutine, or other unit suitable for use in a computing environment. The computer program can correspond to a file in a file system and can be stored in a portion of a file that holds other programs or data, such as one or more scripts stored in a markup language document, in a single file dedicated to the program in question, or in multiple coordinated files, such as files that store one or more modules, sub programs, or portions of code. The computer program can be executed on one computer or on multiple computers that are located at one site or distributed across multiple sites and interconnected by a data communication network.

The term "database" refers to any collection of data. The data can be unstructured or structured in any manner. The data can be stored on one or more storage devices in one or more locations. For example, an index database can include multiple collections of data, each of which may be organized and accessed differently.

The term "engine" refers to a software-based system, subsystem, or process that is programmed to perform one or more specific functions. The engine can be implemented as one or more software modules or components, or can be installed on one or more computers in one or more locations. A particular engine can have one or more computers dedicated thereto, or multiple engines can be installed and running on the same computer or computers.

The processes and logic flows described herein can be performed by one or more computers executing one or more computer programs to perform functions by operating on input data and generating output data. The processes and logic flows can also be performed by special purpose logic circuitry, or by a combination of special purpose logic circuitry and one or more computers.

A computer or special purposes logic circuitry executing the one or more computer programs can include a central processing unit, including general or special purpose microprocessors, for performing or executing instructions and one or more memory devices for storing the instructions and data. The central processing unit can receive instructions and data from the one or more memory devices, such as read only memory, random access memory, or combinations thereof, and can perform or execute the instructions. The computer or special purpose logic circuitry can also include, or be operatively coupled to, one or more storage devices for storing data, such as magnetic, magneto optical disks, or optical disks, for receiving data from or transferring data to. The computer or special purpose logic circuitry can be embedded in another device, such as a mobile phone, a personal digital assistant (PDA), a mobile audio or video player, a game console, a Global Positioning System (GPS), or a portable storage device, e.g., a universal serial bus (USB) flash drive, as examples.

Computer readable media suitable for storing the one or more computer programs can include any form of volatile or non-volatile memory, media, or memory devices. Examples include semiconductor memory devices, e.g., EPROM, EEPROM, or flash memory devices, magnetic disks, e.g., internal hard disks or removable disks, magneto optical disks, CD-ROM disks, DVD-ROM disks, or combinations thereof.

Aspects of the disclosure can be implemented in a computing system that includes a back end component, e.g., as a data server, a middleware component, e.g., an application server, or a front end component, e.g., a client computer having a graphical user interface, a web browser, or an app, or any combination thereof. The components of the system can be interconnected by any form or medium of digital data communication, such as a communication network. Examples of communication networks include a local area network (LAN) and a wide area network (WAN), e.g., the Internet.

The computing system can include clients and servers. A client and server can be remote from each other and interact through a communication network. The relationship of client and server arises by virtue of the computer programs running on the respective computers and having a client-server relationship to each other. For example, a server can transmit data, e.g., an HTML page, to a client device, e.g., for purposes of displaying data to and receiving user input from a user interacting with the client device. Data generated at the client device, e.g., a result of the user interaction, can be received at the server from the client device.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A method, comprising:
receiving, by one or more processors from a merchant, digital component campaign information comprising a base conversion value, one or more additional conversion values, a base bid value, one or more additional bid values, and ground truth data indicating one or more disengaged consumers;
receiving, by the one or more processors from a publisher, a request for a digital component;
generating, by executing a first stage model of an artificial intelligence (AI) model trained offline using the ground truth data, one or more consumer embedding representations;
generating, by executing a second stage model of the AI model trained offline using the ground truth data, one or more merchant embedding representations, wherein at least one of the first or second stage model is trained offline;
determining, based on the request for the digital component and the one or more consumer and merchant embedding representations, by the one or more processors executin the AI model online:
(i) a disengaged consumer probability representing a probability a consumer to be presented the digital component is a disengaged consumer, and
(ii) a qualifying disengaged consumer probability representing a probability the consumer to be presented the digital component is a qualifying disengaged consumer; and
dynamically adjusting, by the one or more processors based on the one or more additional bid values or the one or more additional conversion values, and at least one of (i) the disengaged consumer probability or (ii) the qualifying disengaged consumer probability, at least one of a resulting bid value or a resulting conversion value associated with the digital component.

2. The method of claim 1, wherein the one or more disengaged consumers are previously existing consumers that meet one or more disengagement criteria.

3. The method of claim 2, wherein the one or more disengagement criteria comprise a set of criteria, and the previously existing consumer is a disengaged consumer when the previously existing consumer fulfills a threshold number of disengagement criteria of the set of criteria.

4. The method of claim 1, wherein:
the qualifying disengaged consumer is a disengaged high value consumer,
a disengaged consumer is a previously existing consumer that meets one or more disengagement criteria defined by the merchant,
a high value consumer is a consumer that meets one or more value qualifications defined by the merchant, and
the disengaged high value consumer is the consumer that meets the one or more value qualifications and the one or more disengagement criteria.

5. The method of claim 1, wherein determining the disengaged consumer probability and the qualifying disengaged consumer probability occurs at a time of bidding to select the digital component in response to the received request.

6. The method of claim 1, wherein at least one of the one or more additional conversion values corresponds to a disengaged consumer conversion value or a qualifying disengaged consumer conversion value, and when dynamically adjusting the resulting conversion value the method further comprises multiplying the disengaged consumer conversion value or the qualifying disengaged consumer conversion value with the respective disengaged consumer probability or qualifying disengaged consumer probability.

7. The method of claim 1, wherein at least one of the one or more additional bid values corresponds to a disengaged consumer bid value or a qualifying disengaged consumer bid value, and the method further comprises determining a total bid value based on the base bid value, the disengaged consumer bid value, the qualifying disengaged consumer bid value, the disengaged consumer probability, and the qualifying disengaged consumer probability.

8. The method of claim 1, further comprising determining, by the one or more processors based on the disengaged consumer probability or the qualifying disengaged consumer probability, whether a conversion is at least one of a disengaged consumer conversion or a qualifying disengaged consumer conversion.

9. The method of claim 8, wherein determining whether the conversion is the at least one of the disengaged consumer conversion or the qualifying disengaged consumer conversion comprises comparing, by the one or more processors, a randomized number to the qualifying disengaged consumer probability,
wherein when the randomized number is less than the qualifying disengaged consumer probability, the conversion corresponds to the qualifying disengaged consumer conversion, and
wherein when the randomized number is greater than the qualifying disengaged consumer probability, the conversion corresponds to another type of conversion, wherein the other types of conversions include at least one of a disengaged consumer conversion, an existing consumer conversion, or an unknown consumer conversion.

10. A system, comprising:
one or more processors, wherein the one or more processors are configured to:
receive, from a merchant, digital component campaign information comprising a base conversion value, one or more additional conversion values, a base bid value, one or more additional bid values, and ground truth data indicating one or more disengaged consumers;
receive, from a publisher, a request for a digital component;
generate, by executing a first stage model of an artificial intelligence (AI) model trained offline using the ground truth data, one or more consumer embedding representations;
generate, by executing a second stage model of the AI model trained offline using the ground truth data, one or more merchant embedding representations, wherein at least one of the first or second stage model is trained offline;
determine, based on the request for the digital component and the one or more consumer and merchant embedding representations, by executing the AI model online:

(i) a disengaged consumer probability representing a probability a consumer to be presented the digital component is a disengaged consumer, and (ii) a qualifying disengaged consumer probability representing a probability the consumer to be presented the digital component is a qualifying disengaged consumer; and dynamically adjust, based on the one or more additional bid values or the one or more additional conversion values, and at least one of (i) the disengaged consumer probability or (ii) the qualifying disengaged consumer probability, at least one of a resulting bid value or a resulting conversion value associated with the digital component.

11. The system of claim 10, wherein the one or more disengaged consumers are previously existing consumers that meet one or more disengagement criteria.

12. The system of claim 11, wherein the one or more disengagement criteria comprise a set of criteria, and the previously existing consumer is a disengaged consumer when a previously existing consumer fulfills a threshold number of disengagement criteria of the set of criteria.

13. The system of claim 10, wherein:

the qualifying disengaged consumer is a disengaged high value consumer, a disengaged consumer is a previously existing consumer that meets one or more disengagement criteria defined by the merchant, a high value consumer is a consumer that meets one or more value qualifications defined by the merchant, and the disengaged high value consumer is the consumer that meets the one or more value qualifications and the one or more disengagement criteria.

14. The system of claim 10, wherein determining the probability that the consumer being presented with the digital component is the at least one of a disengaged consumer or a qualifying disengaged consumer occurs at a time of bidding to select the digital component in response to the received request.

15. The system of claim 13, wherein at least one of the one or more additional conversion values corresponds to a disengaged consumer conversion value or a qualifying disengaged consumer conversion value, and when dynamically adjusting the resulting conversion value the one or more processors are further configured to multiplying the disengaged consumer conversion value or the qualifying disengaged consumer conversion value with the respective disengaged consumer probability or qualifying disengaged consumer probability.

16. A non-transitory computer-readable medium storing instructions, which when executed by one or more processors, cause the one or more processors to:

receive, from a merchant, digital component campaign information comprising a base conversion value, one or more additional conversion values, a base bid value, one or more additional bid values, and ground truth data indicating one or more disengaged consumers;

receive, from a publisher, a request for a digital component;

generate, by executing a first stage model of an artificial intelligence (AI) model trained offline using the ground truth data, one or more consumer embedding representations;

generate, by executing a second stage model of the AI model trained offline using the ground truth data, one or more merchant embedding representations, wherein at least one of the first or second stage model is trained offline;

determine, based on the request for the digital component and the one or more consumer and merchant embedding representations, by executing the AI model trained online:

(i) a disengaged consumer probability representing a probability a consumer to be presented the digital component is a disengaged consumer, and (ii) a qualifying disengaged consumer probability representing a probability the consumer to be presented the digital component is a qualifying disengaged consumer; and dynamically adjust, based on the one or more additional bid values or the one or more additional conversion values and at least one of (i) the disengaged consumer probability or (ii) the qualifying disengaged consumer probability, at least one of a resulting bid value or a resulting conversion value associated with the digital component.

17. The method of claim 1, wherein:

the first stage model is trained, based on at least one of consumer data or digital component data for one or more merchants, to identify one or more characteristics of a consumer that is likely to complete a conversion for a given digital component, and the second stage model is trained to determine:

(i) the disengaged consumer probability, and (ii) the qualifying disengaged consumer probability.

18. The method of claim 1, wherein:

the first stage model is configured to map raw consumer data to a consumer representation, the second stage model is configured to determine, based on the consumer representation:

(i) the disengaged consumer probability, and (ii) the qualifying disengaged consumer probability, and the consumer representation comprises the one or more consumer embedding representations.

19. The method of claim 1, further comprising:

associating, by the one or more processors, labels of the ground truth data with the digital component campaign information; and training, by the one or more processors, the first stage model and the second stage model with at least some of the labels associated with the ground truth data and the digital component campaign information.

20. The method of claim 1, wherein:

the one or more consumer embedding representations correspond to an embedded set of numbers to represent one or more consumers; and the one or more merchant embedding representations correspond to one or more embedded set of numbers to represent respective merchants.

21. The method of claim 1, further comprising:

receiving, by the one or more processors, feedback related to the determinations of the AI model; and updating, by the one or more processors, based on the feedback, the AI model.

* * * * *